United States Patent
Ahmed et al.

(10) Patent No.: US 12,468,715 B2
(45) Date of Patent: *Nov. 11, 2025

(54) PERFORMING TARGETED SEARCHING BASED ON A USER PROFILE

(71) Applicant: Microsoft Technology Licensing, LLC, Redmond, WA (US)

(72) Inventors: Junaid Ahmed, Bellevue, WA (US); Waleed Malik, Bellevue, WA (US); Arnold Overwijk, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,863

(22) Filed: Feb. 12, 2024

(65) Prior Publication Data

US 2024/0184790 A1    Jun. 6, 2024

Related U.S. Application Data

(63) Continuation of application No. 17/163,278, filed on Jan. 29, 2021, now Pat. No. 11,921,728.

(51) Int. Cl.
   *G06F 17/00*    (2019.01)
   *G06F 7/00*    (2006.01)
   (Continued)

(52) U.S. Cl.
   CPC ....... *G06F 16/24578* (2019.01); *G06N 20/00* (2019.01)

(58) Field of Classification Search
   CPC .......................... G06F 16/24578; G06N 20/00
   (Continued)

(56) References Cited

U.S. PATENT DOCUMENTS

| | | | |
|---|---|---|---|
| 9,129,227 B1 * | 9/2015 | Yee | G06N 3/047 |
| 10,108,673 B2 * | 10/2018 | Allen | G06F 16/24578 |

(Continued)

FOREIGN PATENT DOCUMENTS

| | | |
|---|---|---|
| CN | 106462626 A | 2/2017 |
| CN | 110520858 A | 11/2019 |
| CN | 111190997 A | 5/2020 |

OTHER PUBLICATIONS

Communication pursuant to Article 94(3) Received in European Patent Application No. 22703205.9, mailed on May 21, 2024, 6 pages.

(Continued)

*Primary Examiner* — Pavan Mamillapalli

(57) ABSTRACT

Aspects of the present disclosure relate to systems and methods for performing targeted searching based on a user profile. In examples, a user profile including a user embedding may be retrieved based on the receipt of a user indication. The user embedding may be created based on one or more user interest. A plurality of document embeddings may be identified based on the user embedding, where each document embedding of the plurality of document embeddings is determined to be within a first distance of the user embedding. In examples, a ranking for each document embedding of the plurality of document embeddings may be generated, where the ranking for each document embedding of the plurality of document embeddings is based on the user embedding. At least one document may be recommend based on a ranking associated with a document embedding.

20 Claims, 12 Drawing Sheets

(51) Int. Cl.
  *G06F 16/2457* (2019.01)
  *G06N 20/00* (2019.01)

(58) Field of Classification Search
  USPC .......................................................... 707/734
  See application file for complete search history.

(56) References Cited

U.S. PATENT DOCUMENTS

| | | | | |
|---|---|---|---|---|
| 11,921,728 | B2* | 3/2024 | Ahmed | ............. G06F 16/24578 |
| 2002/0078045 | A1* | 6/2002 | Dutta | .................... G06F 16/334 |
| 2005/0071328 | A1* | 3/2005 | Lawrence | ........... G06F 16/9535 |
| 2006/0248059 | A1 | 11/2006 | Chi et al. | |
| 2007/0255707 | A1* | 11/2007 | Tresser | ................. G06F 16/283 |
| 2008/0250008 | A1* | 10/2008 | Gollapudi | ........... G06F 16/3322 |
| | | | | 707/999.005 |
| 2009/0177651 | A1* | 7/2009 | Takamatsu | .......... G06F 16/9535 |
| | | | | 707/999.005 |
| 2009/0276403 | A1* | 11/2009 | Tamayo | .............. G06F 16/2465 |
| 2010/0228715 | A1* | 9/2010 | Lawrence | ........... G06F 16/9536 |
| | | | | 707/706 |
| 2010/0262570 | A1* | 10/2010 | Tateno | .................. G06F 16/635 |
| | | | | 706/12 |
| 2012/0253792 | A1* | 10/2012 | Bespalov | .............. G06F 16/353 |
| | | | | 704/9 |
| 2014/0236875 | A1* | 8/2014 | Phillipps | ............ G06Q 30/0202 |
| | | | | 706/12 |
| 2018/0285774 | A1 | 10/2018 | Soni et al. | |
| 2019/0018692 | A1* | 1/2019 | Indyk | ...................... G06F 9/453 |

OTHER PUBLICATIONS

First Office Action Received for Chinese Application No. 202280012416.8, mailed on Sep. 12, 2025, 25 pages (English Translation Provided).

* cited by examiner

PERFORMING TARGETED SEARCHING BASED ON A USER PROFILE

CROSS-REFERENCE TO RELATED APPLICATIONS

This application is a continuation application of U.S. patent application Ser. No. 17/163,278, filed on Jan. 29, 2021, the disclosure of which is hereby incorporated by reference in its entirety.

BACKGROUND

Information search and retrieval systems target content indexed in repositories based on user provided keywords. Though relevant to the keywords provided by the user, the indexed content may not be targeted to or otherwise specific to the user. That is, when identifying indexed content from user provided keywords, such systems base results on how well the content matches the user provided keywords, rather than retrieving indexed content tailored to the user requesting such content. Further, the most timely and/or relevant information that is specific to a user may not be indexed by such systems, as such timely and/or relevant information may be found in non-indexed tail content. Tail content refers to web content which is not universally popular; such content is often not included in consolidated content sources, such as news sites, which are typically the focus of information search and retrieval systems. A search approach that limits retrieval of information to a fixed set of publishers cannot present the best targeted content to a user based on user interest.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to performing a targeted search based on a user profile. In examples, a user embedding derived from a user profile is used to identify a set of documents based on document embeddings for each respective document. As an example, an approximate nearest neighbor search identifies document embeddings that are similar, or otherwise close, to the user embedding, where the user embedding and the document embeddings may share the same semantic space. Accordingly, a large corpus of document embeddings may be reduced in size to only those document embeddings that are close to the user embedding. Thus, subsequent processing can be performed on a subset of the large corpus of document embeddings thereby saving computing cycles, memory, and the like. A transformer model analyzes the set of document embeddings and generates a high quality ranking for each document in the set of documents. Accordingly, a targeted search can identify documents that are semantically similar to the user profile.

In examples, the user profile is assembled based on user interests derived from documents of interest, click streams, and other metrics. Accordingly, the targeted content search identifies niche content that is timely and relevant to a user. Such niche content is located in news sites, mainstream sites, and in other forms of web content, such as but not limited to tail content. A targeted search system, in accordance with the present disclosure, locates such niche content, ingests each content item, and generates a document embedding for each content item. As previously described, the targeted search system generates a user model including the user embedding based on gathered information about the user, such as the user profile. Each of the document embeddings and the user embedding may share the same or similar semantic space, where the semantic space is a representation of data that is capable of capturing meaning. Based on a plurality of document embeddings and the user embedding, the targeted search system identifies document embeddings that are semantically close to the user embedding. The pool of document embeddings is then ranked using a neural network model. The pool of document embeddings is ranked based on various factors, including but not limited to relevance, novelty, serendipity, diversity, and explainability. Based on the rankings, one or more documents are located as part of the targeted searching. In examples, the one or more documents are presented to the user in a user feed. In addition, various collected metrics based on user interaction, and non-interaction, with the presented documents are used to further tune, or otherwise change, the subsequent ranking of documents such that documents presented to the user are specific to the user.

In accordance with at least one aspect of the present disclosure, systems and methods of performing a targeted search based on user interests are described. In examples, the method is performed at a targeted search system in data communication with a network. The method includes receiving a user identifier for a user and retrieving a user embedding based on the user identifier, where the user embedding is created according to one or more user interests. The method may also include a first step of a targeted search to target an initial document pool by identifying a set of document embeddings from a plurality of document embeddings based on the user embedding, where each document embedding of the set of document embeddings is determined to be within a first distance of the user embedding. By reducing a corpus of documents and/or document embeddings to only those that are close to the user embedding, a saving in computing cycles can be realized. Each document in the pool may then be ranked by generating a ranking for each document embedding of the set of document embeddings, where the ranking for each document embedding of the set of document embeddings is based on the user embedding. In examples, a transformer model is utilized to generate the rankings for each document embedding. Accordingly, targeted content based on user interests can be recommended to the user by recommending at least one document based on the ranking for each document embedding of the set of document embeddings.

In accordance with at least one aspect of the present disclosure, systems and methods of performing a targeted search based on user interests are described. In examples, a method is performed at a targeted search system in data communication with a network. The method includes extracting information from each document of a plurality of documents and generating a document embedding based on the extracted information. In addition, the documents closest to a user embedding may be identified. For example, the method may include receiving user interest information for a user and generating a user embedding based on the received user interest information, where the user embedding and the document embedding share a same semantic space. Accordingly, the method may identify a set of document embeddings from the plurality of document embeddings, each document embedding of the set of document embeddings being within a first distance of the user embedding. By reducing a corpus of documents and/or document embeddings to only those that are close to the user embedding, a saving in computing cycles can be realized. Each document in the pool may then be ranked by generating a ranking for each document embedding of the set of document embeddings, where the ranking for each document embedding is based on the user embedding. Accordingly, targeted content based on user interests can be recommended to the user by recommending to the user at least one document based on the document embedding ranking.

In accordance with at least one aspect of the present disclosure, systems and methods of performing a targeted search based on user interests are described. In examples, a method is performed at a targeted search system in data communication with a network. The method includes receiving a user identifier for a user; retrieving a user profile based on the user identifier, the user profile including a user embedding created according to one or more user interests; identifying a plurality of document embeddings based on the user embedding, each document embedding of the plurality of document embeddings determined to be within a first distance of the user embedding; generating a ranking for each document embedding of the plurality of document embeddings, wherein the ranking for each document embedding of the plurality of document embeddings is based on the user embedding; and recommending to the user at least one document based on the ranking for each document embedding of the plurality of document embeddings. In some examples, the user embedding and the document embedding may have the same or similar semantic space; accordingly, the targeted search system may reduce a corpus of documents to a subset of documents thereby saving computational cycles, and then further rank the subset of documents using a transformer network model. Thus, targeted content based on a user profile can be provided to a user.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following FIGURES.

DETAILED DESCRIPTION

Figure 1:
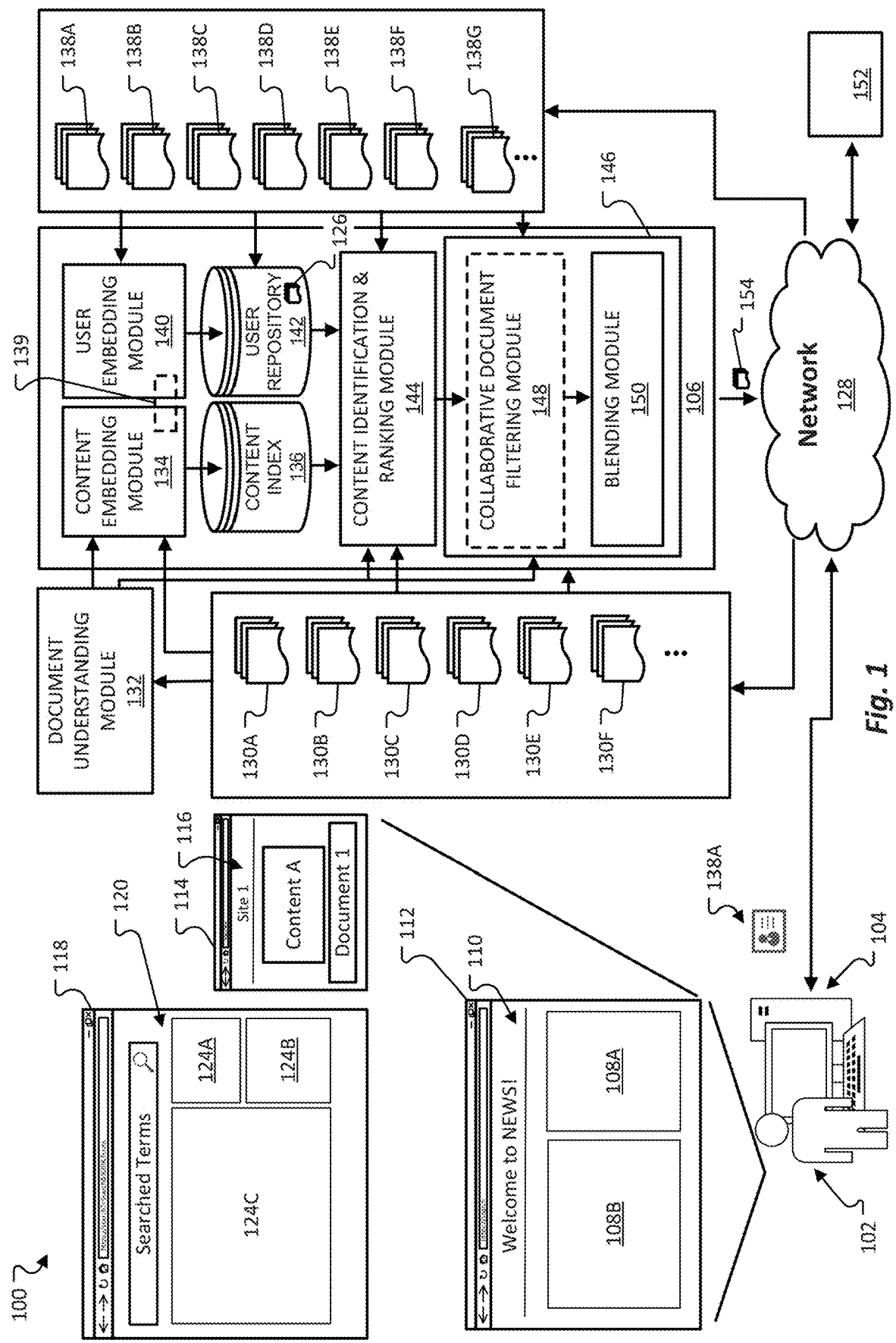
FIG. 1 depicts details of a targeted search and display system in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A targeted search and display system identifies and recommends content such as a document, webpage, etc., to a user that is of precise and narrow interest to that user. For example, a user may have an interest is long trail runs across the world. The best timely information about these trails is often in blogs or other runner reports, not on a consolidated source like a news site. An approach that limits retrieval to a fixed set of publishers cannot present the best pages for this interest. While content is already discovered, crawled, and provided to a user as part of a user search, search results do not return content that is precisely tailored to a user's interest. Rather, user interests derived from documents of interest, click streams, and other metrics provides the ability to identify niche but high-quality sites that match user interests. More specifically, a targeted search and display system, in accordance with examples of the present disclosure, locates content in a network, such as the internet, ingests each content item, and generates a document embedding for each content item, where the document embedding is a relatively low-dimensional space representation of a translated higher-dimensional vector derived from information associated with each content item. Additionally, the targeted search and display system generates a user model including a user embedding based on gathered information about the user. Similar to the document embedding, the user embedding is a relatively low-dimensional space representation of a translated higher-dimensional vector derived from information associated with the user. Each of the document embeddings and the user embedding may share the same or similar semantic space, where the semantic space is a representation of data that is capable of capturing meaning. As an example, a semantic space may be a representation of natural language, a representation of metadata, or a representation of other information that provides meaning to an item of content and/or a user. Alternatively, or in addition, each of the document embeddings and the user embedding may share the same topic or domain. For example, the document embedding and the user embedding may be generated utilizing a topic or domain that is common to both the user embedding and the document embedding.

Based on the document embedding and the user embedding, the targeted search and display system identifies document embeddings that are semantically close to the user embedding. For example, a nearest neighbor search may identify a pool of content items having document embeddings that are semantically close, or otherwise semantically similar, to the user embedding. Alternatively, or in addition, a nearest neighbor search may identify a pool of content items where each of the document embeddings and the user embedding based on a topic or domain are close. The pool of document embeddings is provided to a ranking module that ranks the document embeddings based on a plurality of factors. In non-limiting examples, the document embeddings are ranked based on relevance, novelty, serendipity, diversity, and explainability. For example, a content item should be relevant to the user. The content item should preferably not have been previously seen by the user. The content item should be somewhat unexpected by the user to increase the likelihood the user continues to utilize such a targeted search and display system. The content item should be diverse in nature, increasing the likelihood of appealing to the user. And, the content items should be explainable, as in a reason should exist as to why the content item is being provided to the user. The pool of ranked documents is then provided to the user or a requestor to be rendered and displayed to a user. In some examples, the pool of ranked documents is subjected to further selection criteria to identify one or more content items that are relevant to the user prior to being provided to the user or requestor. As an example, a content recommendation user profile of the user model may provide additional means for identifying content that may be relevant to the user.

Various metrics are collected based on user interaction, and non-interaction, with content items provided to and/or displayed to the user. The collected metrics are used to further tune, or otherwise change, the content items that are presented to the user by the targeted search and display system. For example, metrics indicating that that the content is not relevant to the user may be used to change one or more parameters associated with the generation of the document embeddings or the user embedding. As another example, one or more of the ranking and/or selection mechanisms may be changed based on the collected metrics. In some examples, the user embedding is based on the collected metrics; for example, an indication that a user does not like a particular document or type of document may be informational when generating the user embedding. In some examples, metrics are collected as part of the targeted search and display system; alternatively, or in addition, metrics are collected via a third-party application and provided to the targeted search and display system as user information.

FIG. 1 depicts details of a targeted search and display system 100 in accordance with examples of the present disclosure. The targeted search and display system 100 includes a targeted search system 106 that provides recommended content for display in one or more display portions 108 of a user interface 110; the user interface 110 is generated by, rendered by, or otherwise provided by an application 112 executing at a computing device 104 of a user. Examples of the computing device 104 include, but are not limited to, a personal computer and/or laptop, a cellular phone, a smart phone, and a tablet. In examples, a user launches an application 112 causing the user interface 110 to be displayed or otherwise provided to the user. Examples of application 112 include, but are not limited, to a web browser, a productivity application, or a gaming application. The user interface 110 may include a display portion 108A displaying content recommended by the targeted search system 106 while the display portion 108B may display other content. The other content displayed in the display portion 108B may correspond to information associated with a webpage or website, productivity content such as but not limited to content from a word processing application, spreadsheet, database, or the like, and/or content associated with a gaming platform. In non-limiting examples, the display portion 108A may include the recommended content as part of an information feed, widget, or portal.

As previously discussed, user information is gathered and used to generate a user embedding. The user information is gathered from user interactions with other applications, content, and/or devices. As an example, a user may view content in a user interface 116 of an application 114. The location (e.g., uniform resource locator (URL)) of the content displayed to the user, as well as other content related information is used in the generation of the user embedding. As an example, telemetry data associated with a user interaction with an application 114 may be gathered. The telemetry data may include information that was previously shown and/or clicked by a user; in some examples, this information corresponds to content that was recommended by the targeted search system 106. As another example, an application 118 such as a web browser may display a user interface 120 that includes search results from user-provided keywords. The search results may be displayed in a display portion 124C. In some examples, the display portions 124A and/or 124B include content recommended from the targeted search system 106. Information about the content presented at the user interface 120, as well as what was clicked by a user, how long a user viewed what content, when the user viewed the content, and any additional information that may be indicative of one or more interests of a user may be collected. The collected information is then provided to the targeted search system 106 via a network 128.

The network 128 may be packet-switched and/or circuit-switched. An illustrative communication network 128 includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a Voice over IP (VOIP) network, a SIP network, and/or combinations thereof. The Internet is an example of the network 128 that constitutes an Internet Protocol (IP) network including many computers, computing networks, servers, and other communication devices located all over the world, which are connected through many telephone systems and other means. In one configuration, the network 128 is a public network supporting the TCP/IP suite of protocols. Communications supported by the network 128 include real-time, near-real-time, and non-real-time communications. For instance, the network 128 may support voice, video, text, web-conferencing, or any combination of media. Moreover, the network 128 may include a number of different communication media such as coaxial cable, copper cable/wire, fiber-optic cable, antennas for transmitting/receiving wireless information, and combinations thereof. In addition, it can be appreciated that the network 128 need not be limited to any one network type, and instead is comprised of a number of different networks and/or network types. It should be appreciated that the network 128 may be distributed. Although examples of the present disclosure refer to the network 128 as one network 128, it should be appreciated that the embodiments claimed herein are not so limited. For instance, multiple networks 128 may be joined by many servers and networks.

As previously mentioned, user information 138 may be collected and/or gathered to model user interest to identify content that is most likely to be of interest to the user. User information 138 may include, but is not limited to, a user id 138A, explicit user interests 138B, browser search history 138C, search engine clicks 138D, search engine queries 138E, other content 138F consumed by an application utilized by the user, and/or other user metric information 138G (e.g., dwell time, telemetry data, etc.) that may be used to model user behaviors and user interests. The user id 138A may come from the computing device 104 of the user 102. A targeted search system user profile 126 is created which includes a user embedding learned from previous user interactions and user facts, topics of interest, and key phrases of interest. The user embedding module 140 generates a user embedding and stores or otherwise associates the user embedding with the targeted search system user profile 126; the targeted search system user profile 126 can be stored in the user repository 142. In some examples, the user embedding generated by the user embedding module 140 may reside in the user repository 142; accordingly, based on a user id, such as the user id 138A, the user embedding for the user can be retrieved.

In examples, the targeted search system 106 ingests content items and generates content embeddings based on the content items. The content items may refer to documents, web pages, images, videos, etc. that are discovered and indexed by an internet content scraping or internet crawling system. Examples of the content items include, but are not limited to web pages 130A, news items 130B, local items 130C such as content local to the user, videos 130D, images 130E, and other information items 130F. In some examples, the content items are received at the document understanding module 132. The document understanding module 132 generates one or more signals per content item, also referred to as a document, which is fed to the content embedding module 134 and, in some instances, the content identification & ranking module 144. In examples, the document understanding module 132 extracts and/or generates document understanding information including, but not limited to, a title of the document, a dominant image contained within or otherwise referenced by the document, a snippet summary of the document, a publication date of the document, a topic of the document, key phrases of the document, and/or a genre of the document. Of course, other information may be generated and/or extracted and is contemplated herein. In some examples, the document understanding module 132 generates and/or extracts information that may be used later by the content identification and ranking module 144. In examples, such information includes, but is not limited to, document topics, document key phrases, document timeliness, document quality, a source authority for the document, document depth, popularity of the document, location of the document both as a referenced location and/or as a geographic location associated with the document, such as a review of a business located at a specific geographic location and providing services that are available within a radius of the geographic location, etc. In some examples, the document understanding module 132 employs machine learning models to semantically understand the document and classify the document into one or more logical categories. Such logical categories may include but are not limited to articles, news, products, etc.

Information generated by and/or extracted by the document understanding module 132 is received at the content embedding module 134. For each content item (e.g., document), the content embedding module generates a document embedding using one or more trained machine learning models. The document embedding may be a relatively low-dimensional space representation of a translated higher-dimensional vector derived from information associated with each content item. For example, the generated and/or extracted document understanding information is provided to the content embedding module 134 and the content embedding module generates a document embedding for a content item. The document embedding, and in some instances the generated and/or extracted document understanding information is stored in the content index 136. As previously mentioned, the document embedding module 134 and user embedding module 140 creates embeddings using the same or similar semantic space 139.

The content identification & ranking module 144 receives a user profile including the user embedding and identifies a plurality of documents that are semantically similar to the user embedding. For example, a nearest neighbor search may identify a pool of content items having document embeddings that are semantically close, or otherwise semantically similar, to the user embedding. In examples, the nearest neighbor search is one or more of an approximate nearest neighbor search (ANN), a k-nearest neighbor (KNN) search, and the like. The pool of document embeddings is then ranked based on a plurality of factors. In non-limiting examples, the document embeddings are ranked based on relevance, novelty, serendipity, diversity, and explainability. As previously mentioned, a content item should be relevant to the user; the content item should preferably not have been previously seen by the user; the content item should be somewhat unexpected by the user to increase the likelihood the user continues to utilize such a targeted search and display system; the content item should be diverse in nature, increasing the likelihood of appealing to the user; and, the content items should be explainable, as in a reason should exist as to why the content item is being provided to the user. In examples, the pool of documents is ranked utilizing one or more trained machine learning models, trained to predict whether the user, based on the user profile and the user embedding, will engage with the content item at a point in time. Of course, the ranking may be performed on different types of content differently; for example, videos may be ranked utilizing a different machine learning model than news items.

The pool of ranked documents is then provided to the content recommendation module 146. The content recommendation module 146 identifies one or more content items that are to be provided to the user. In examples, the pool of ranked documents is provided to a collaborative document filtering module 148, where additional documents are identified based on users having similar interests. As an example, documents found to be relevant, novel, serendipitous, diverse, and explainable to users having the same or similar interests as the current user may be identified. Such documents, together with the pool of ranked documents are provided to the blending module 150. The blending module 150 manages tradeoffs inherent in the goals of providing documents that are relevant, novel, serendipitous, diverse, and explainable to a user. In some examples, the blending module 150 gathers feedback on emerging, or recent documents, modifies one or more personalization weightings as more information about a user becomes available, and handles feedback signals to ensure that the content recommended to the user in a session, or within a number of recent sessions, is not repetitive. In addition, one or more application-specific and/or user-specific parameters may override content recommendations. For example, if a user has indicated that a particular document, web page, or content type should not be shown, then the blending module 150 ensures that such document, web page, or content type is not included in the recommended content.

The output of the content recommendation module 146 includes the recommended content 154; the recommended content 154 may include a reference (e.g., a URL) to the content. Alternatively, or in addition, the recommended content 154 may include a summary/link of the documents for presentation to the user 102. Accordingly, the content recommendation module 146 sends a summary/link of the document to the client device for presentation to the user. In some examples, the targeted search system 106 may provide the recommended content 154 to the application 112 such that the display portion 108A is rendered within the user interface 110 and displayed to a user. Alternatively, or in addition, the recommended content 154 is provided to a third-party partner 152 such that the third-party partner causes the recommended content to be provided to the application 112, whereby the application 112 causes the display portion 108A to be rendered within the user interface 110 and displayed to a user.

Figure 2:
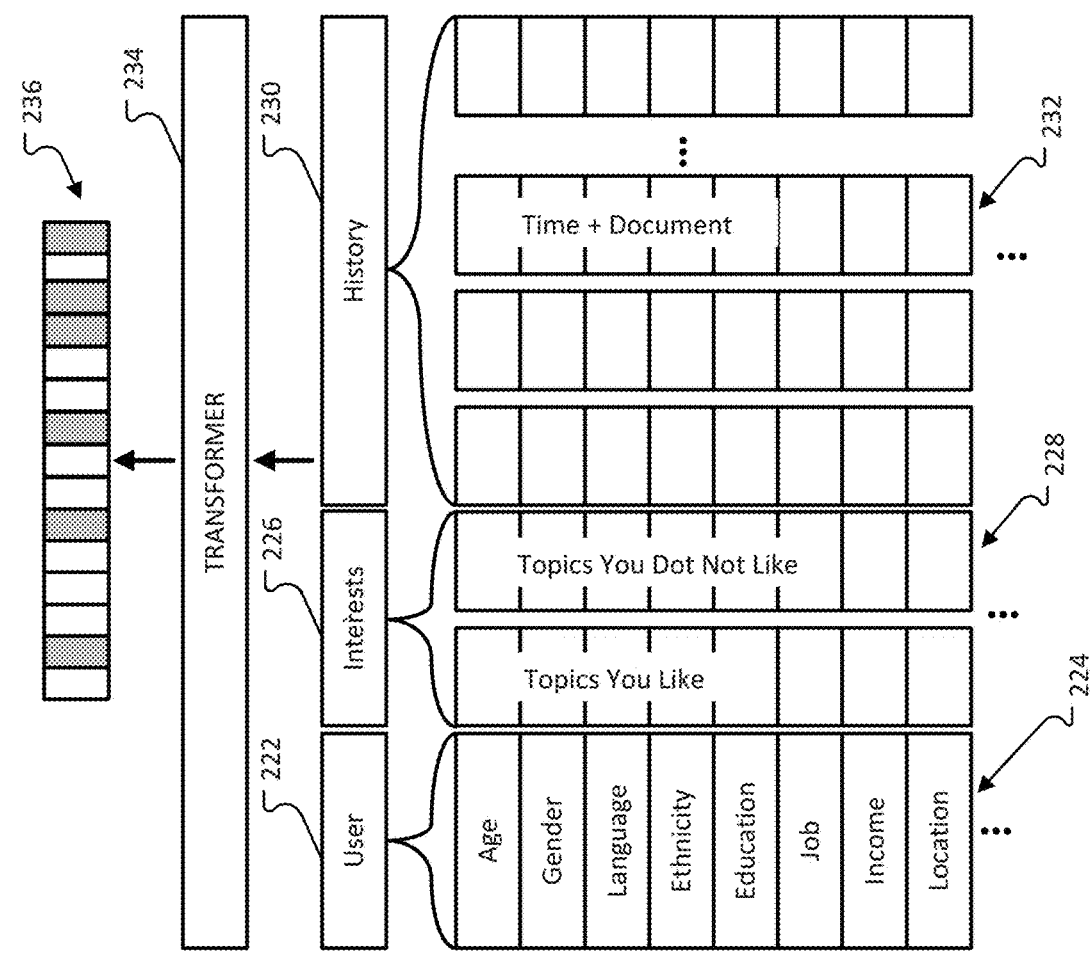
FIG. 2 depicts details directed to a user embedding and a document embedding in accordance with examples of the present disclosure.
Figure 2:
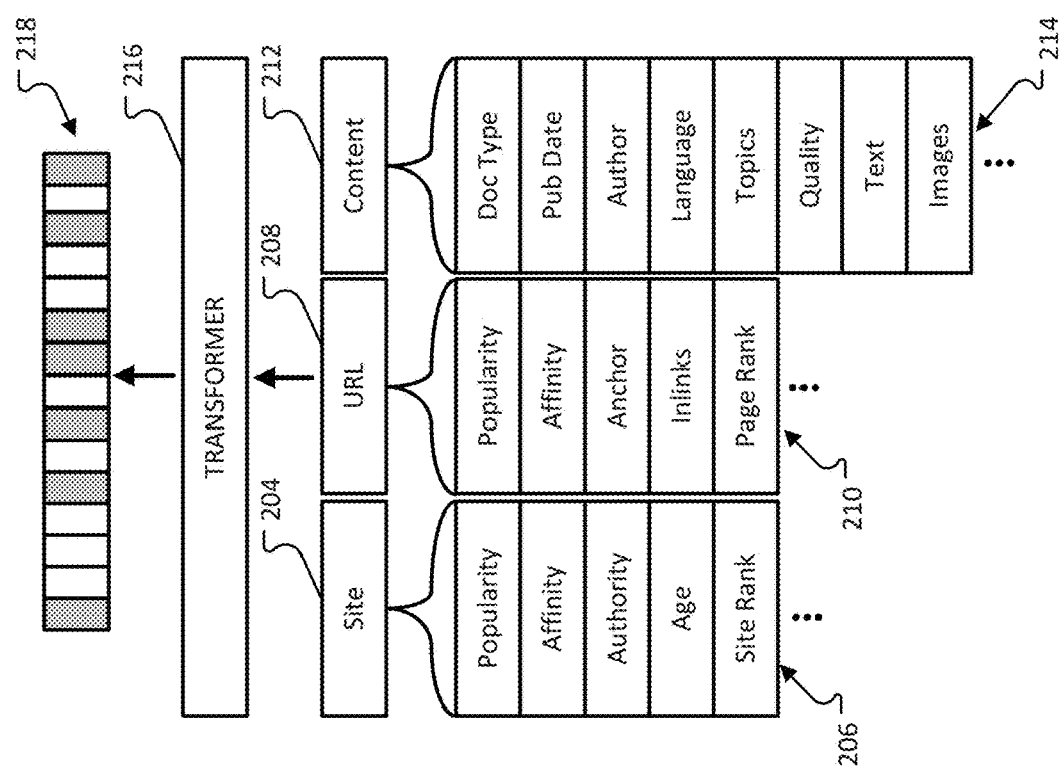

FIG. 2 depicts additional details directed to the user embedding and document embedding in accordance with examples of the present disclosure. More specifically, a document embedding 218 is created and/or generated by one or more machine learning models. The one or more machine learning models may include, but are not limited to, a transformer 216, a convolutional neural network, a recurrent neural network, etc. The document embedding 218 may be a relatively low-dimensional space representation of a translated higher-dimensional vector derived from information associated with each content item. For example, the document embedding are based on site information 204, URL information 208, and content information 212. The site information 204 includes site content items 206 including, but not limited to, site popularity information, site affinity information such as site relationships and site links, site authority information, site age information, site ranking information, and/or additional information related to a site. The URL information 208 may include URL content items 210 including, but not limited to URL popularity information, URL affinity information, URL anchor information, URL linking information, URL page ranking information, and/or additional information related to the URL. The content information 212 includes content items 214 including, but not limited to, a document type, publication date, author, language, topics, quality, text, images, and/or additional information related to the content information 212. The site information 204, URL information 208, and/or the content information 212 are provided to the transformer 216. The transformer 216 transforms the higher dimensional information included in the site information 204, URL information 208, and/or content information 212 into a lower dimensional representation, such as the document embedding 218.

The user embedding 236 is created and/or generated by one or more machine learning models. The one or more machine learning models may include but are not limited to, a transformer 234, a convolutional neural network, a recurrent neural network, etc. The user embedding 236 may be a relatively low-dimensional space representation of a translated higher-dimensional vector derived from information associated with a user. For example, the user embedding is based on user information 222, user interest information 226, and user history information 230. The user information 222 may include user content information 224 including, but not limited to, user age information, user gender information, user language information, user ethnicity information, user education information, user job information, user income information, user location information, and/or additional information related to a user. The user interest information 226 may include user interest content information 228 including, but not limited to, topics that the user likes and topics that the user does not like. In some examples, the user interest content information 228 includes topics that the user likes. In examples, the user interest information 226 may be derived from one or more models configured to identify topics of interest and topics of disinterest based on user interaction information with content items. For example, based on metric information previously discussed, a user dwell time associated with particular content that is high indicates that a topic associated with the content may be of interest to the user. As another example, a user may spend little time viewing content that is of no interest to them. The user history information 230 may include history content information 232 corresponding to information related to documents viewed by the user together with a timestamp. The user history information 230 may be obtained from browser logs, search history, clicks, etc. The user information 222, user interest information 226, and user history information 230 are provided to the transformer 234. The transformer 234 transforms the higher dimensional information included in the user information 222, user interest information 226, and user history information 230 into a lower dimensional representation, such as the document embedding 218. In examples, the transformer 234 and transformer 216 utilize the same or similar semantic space when generating the respective embeddings 236 and 218. Accordingly, the user embedding 236 and the document embedding 218 include the same or similar semantic space. As the user embedding 236 and the document embedding 218 share the same or similar semantic space, distance information between the user embedding 236 and document embedding, such as the document embedding 218 may be calculated and may be relied upon when obtaining an initial pool of documents as previously described.

Figure 3:
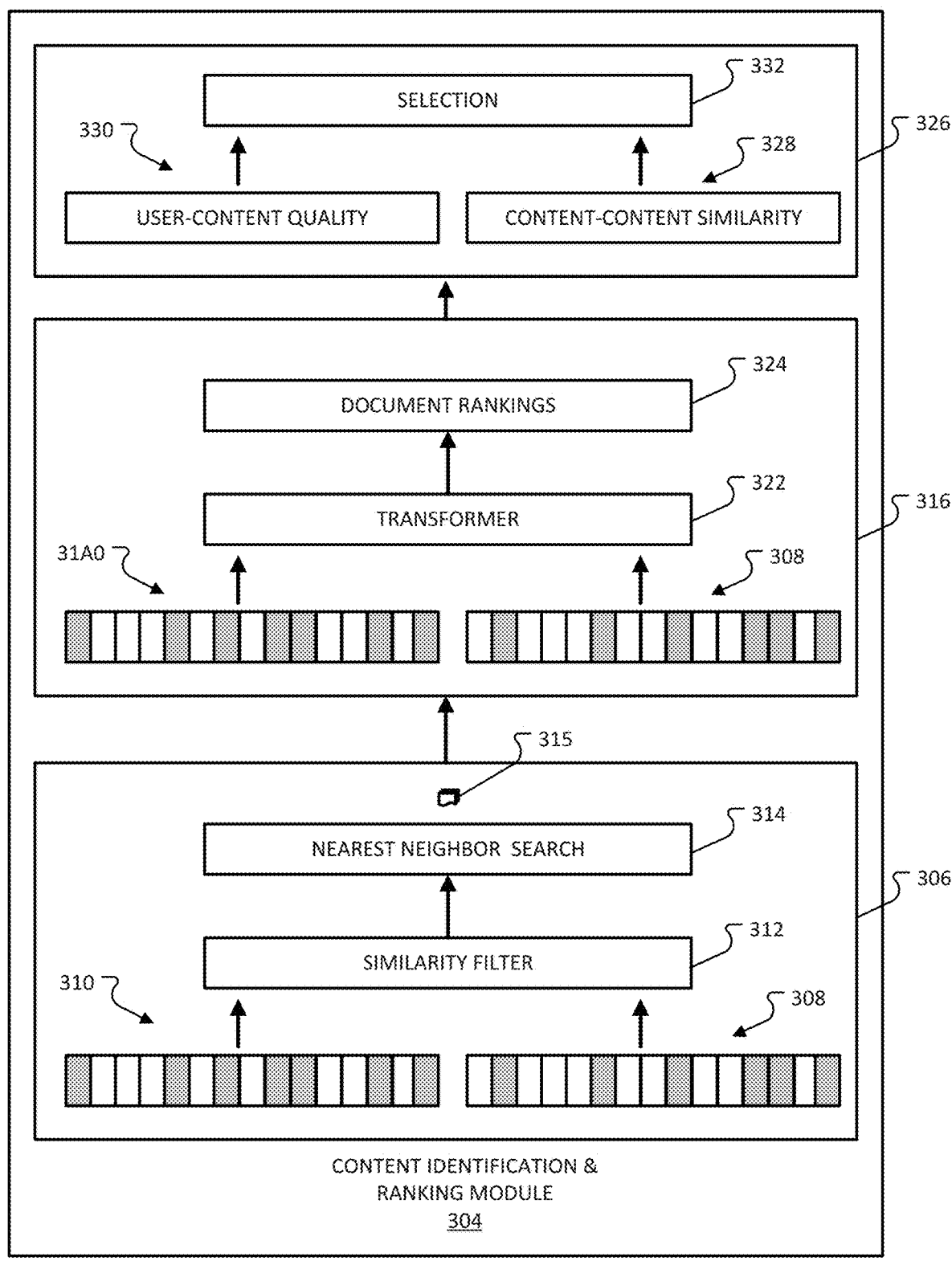
FIG. 3 depicts details of a content identification and ranking module in accordance with examples of the present disclosure.

FIG. 3 depicts additional details of the content identification and ranking module 304 in accordance with examples of the present disclosure. The content identification and ranking module 304 may be the same as or similar to the content identification and ranking module 144 previously described. In examples, the content identification and ranking module 304 includes a first portion 306, second portion 316, and a third portion 326. The first portion 306 refers to a first level of processing that occurs. For example, the first portion 306 acts as an initial filter and may identify document embeddings based on the user embedding for a particular point in time. In examples, the first portion 306 identifies the top n document embeddings that are most similar to the user embedding at the similarity filter 312. More specifically, the user embedding 310 and a plurality of document embeddings 308 are provided to a similarity filter 312. The similarity filter 312 utilizes a similarity metric to efficiently search for the documents that may be similar to the user. In examples, a nearest neighbor search 314 is performed on the similar documents. The nearest neighbor search identifies the similar documents 315 of the document embeddings 308 that are most similar to the user embedding 310. As the document embedding 308 and the user embedding 310 share the same or similar semantic space, a distance can be determined between the user embedding 310 and each document embedding 308. In examples, the distance may include but is not limited to, a Euclidean distance, a cosine distance, and a dot product distance. The first portion 306 can leverage embeddings for document body, document title, document anchor, and select documents 315 which are relevant. This search at the first portion 306 based on user embedding 310 would be a representation-based (or lose coupling) search and would focus on achieving high recall. Those document embeddings 315 that are determined to be similar to the user embedding 310 by the nearest neighbor search 314 are then provided to the second portion 316.

The second portion 316, also referred to as a second level of processing that occurs, ranks each of the documents 315 determined to have a document embedding 308 that is close to the user embedding 310. For example, a transformer 322 may take as input, the user embedding 310 and one or more document embeddings 308 from the documents 315; the transformer 322 then generates a pool of ranked documents 324, where each document in the pool of ranked documents 324 includes a ranking based on the document embedding 308 and the user embedding 310. The transformer 322 applies an attention mechanism to obtain higher quality results than the nearest neighbor search 314 alone because the transformer is operating on many orders of magnitude fewer documents. The ranking implemented by the transformer 322 utilizes interaction-based rankings to obtain those documents which are determined to be deeply relevant to the user while additionally running a detrimental point process for diversifying the ranked results into a set of ranked results that the user is more likely to enjoy. In examples, the pool of ranked documents is then provided to the third portion 326.

The third portion 326, also referred to as a third level of processing that occurs, may identify and select documents from the pool of ranked documents that are most likely to be relevant. Similar to the second portion 316, a detrimental point process is applied to ensure the ranked results are diverse and do not refer to the same content or similar content. Accordingly, a user-content quality score 330 and content-content similarity score 328 are used to select a subset of the pool of ranked documents. The output of the selection 332 can be provided to a user feed for display to the user. Alternatively, or in addition, the output of selection 332 is provided to the content recommendation module 146 as previously described.

Figure 4:
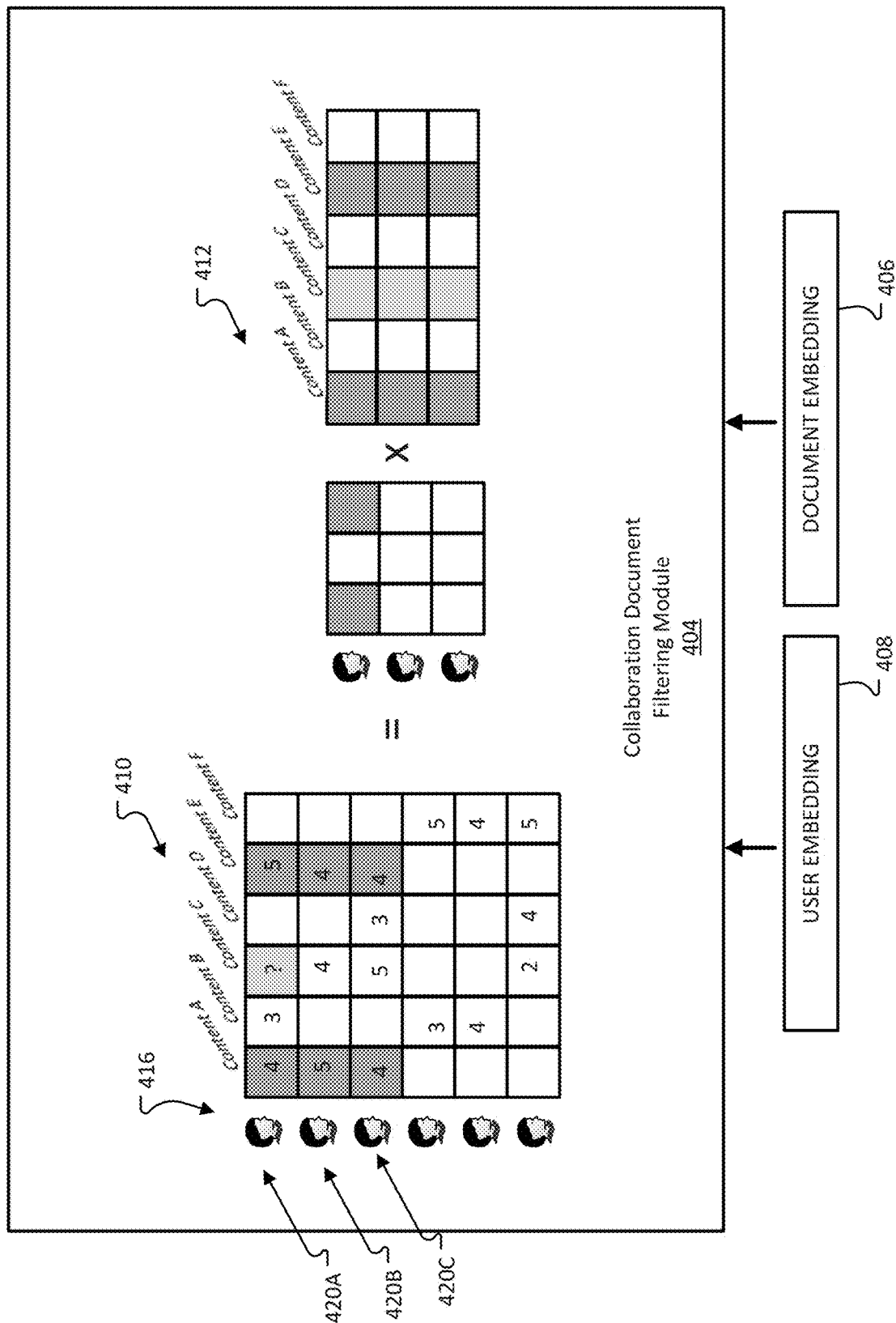
FIG. 4 depicts an example of a collaborative document filtering module in accordance with examples of the present disclosure.

FIG. 4 depicts an example of a collaborative document filtering module 404 in accordance with examples of the present disclosure. The collaborative document filtering module 404 may be the same as or similar to the collaborative document filtering module 148 previously described. Collaborative filtering techniques use a database of preferences for items by users to predict additional topics or products a new user might like. A fundamental assumption of content filtering is that if users X and Y rate n items similarly, or have similar behaviors and/or interests (e.g., viewing the same or similar content, buying the same or similar items, watching the same or similar videos, and/or listening to the same or similar audio content), a new user having the same and/or similar behaviors and/or interests as users X and Y may act in a similar manner. More specifically, the collaborative document filtering module 404 identifies documents found to be relevant, novel, serendipitous, diverse, and explainable to users having the same or similar interests as the current user. For example, user embeddings 408 are utilized to determine which users 416 are similar to a current user. The content, such as content E (based on document embeddings 406), identified from similar users is then recommended to the current user. Thus, users which have viewed similar content 410 for example, are identified and documents determined to be of interest to the identified user are provided to a current user or otherwise provided to a subsequent blending module as previously described. Such documents, together with the pool of ranked documents are then provided to the blending module 150.

In examples, a rating or score may be established for each item of content 410; such rating or score can be derived from a user embedding indicating a user's interaction and/or level of interest with the content item. A recommended content item is then provided or otherwise suggested to a user based on other users having similar ratings or scores for similar content items. For example, users 420B and 420C may have scores or ratings for content items A and E as user 420A. In addition, users 420B and 420C may have scored content for content item C. Accordingly, a subset 412 of users (e.g., 420A, 420B, and 420C) are selected and a recommended content item C may be recommended to the user 420A from the content based on the similar score or ratings for content items A and E for users 420A, 420B, and 420C. These recommendations, together with the pool of ranked documents are provided to the blending module 150.

Figure 5:
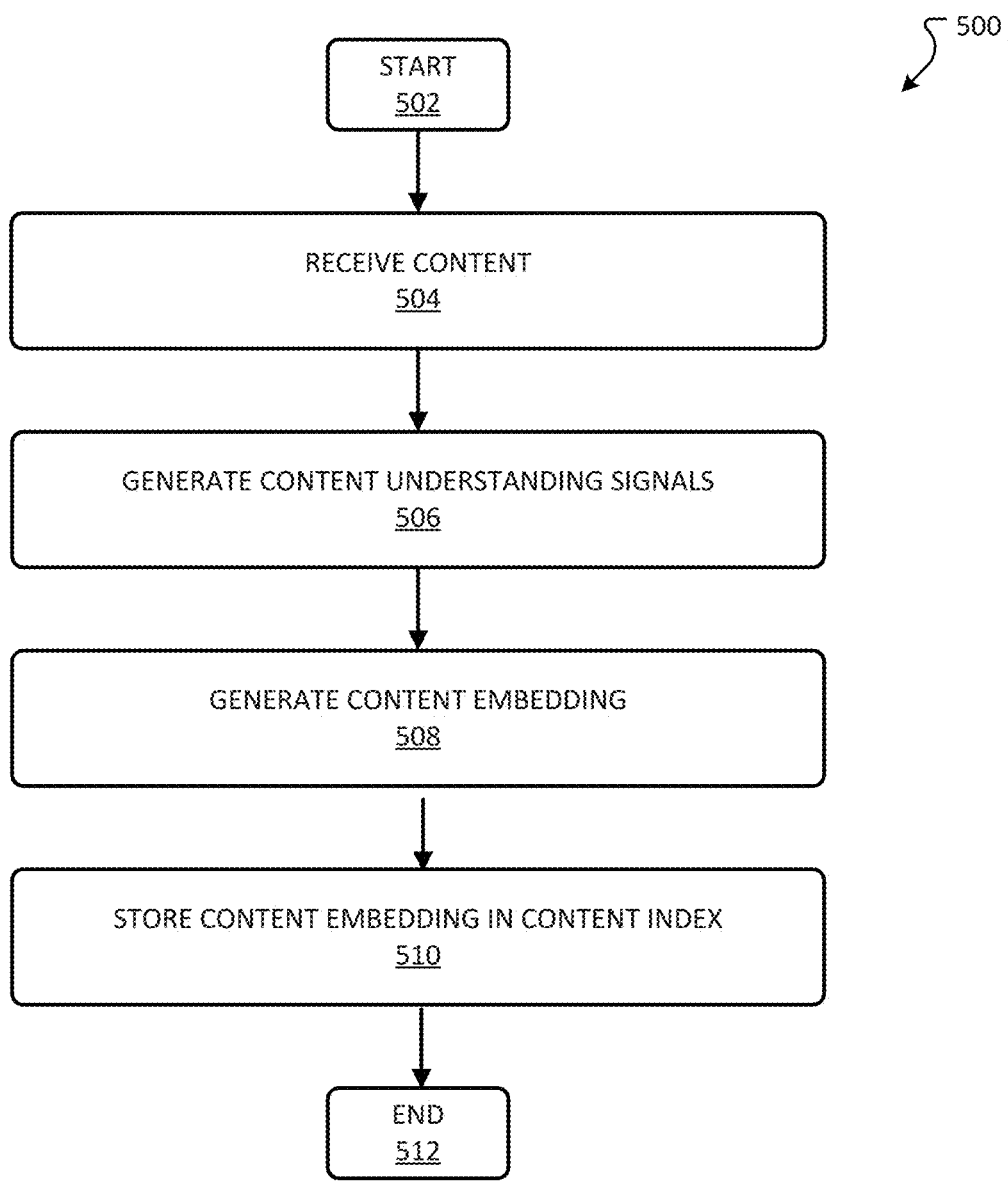
FIG. 5 depicts details of a method for generating a document embedding in accordance with examples of the present disclosure.

FIG. 5 depicts details of a method 500 for generating a document embedding in accordance with examples of the present disclosure. A general order for the steps of the method 500 is shown in FIG. 5. Generally, the method 500 starts at 502 and ends at 512. The method 500 may include more or fewer steps or may arrange the order of the steps differently than those shown in FIG. 5. The method 500 can be executed as a set of computer-executable instructions executed by a computer system and encoded or stored on a computer readable medium. In examples, aspects of the method 500 are performed by one or more processing devices, such as a computer or server. Further, the method 500 can be performed by gates or circuits associated with a processor, Application Specific Integrated Circuit (ASIC), a field programmable gate array (FPGA), a system on chip (SOC), a neural processing unit, or other hardware device. Hereinafter, the method 500 shall be explained with reference to the systems, components, modules, software, data structures, user interfaces, etc. described in conjunction with FIGS. 1-4.

The method starts at 502, where flow may proceed to 504. At 504, content is received. Examples of the content that may be received, include, but are not limited to web pages, news items, local items such as content local to the user, videos, images, and other information items. In some examples, document understanding signals are generated at 506. For example, the content is received at a document understanding module, such as the document understanding module 132 (FIG. 1). The document understanding module generates one or more signals per items of content. In examples, the document understanding module extracts and/or generates document understanding information including, but not limited to, a title of the document, a dominant image contained within or otherwise referenced by the document, a snippet summary of the document, a publication date of the document, a topic of the document, key phrases of the document, and/or a genre of the document. Of course, other information may be generated and/or extracted and is contemplated herein. In some examples, the document understanding module generates and/or extracts information that may be used later by the content identification and ranking module. In examples, such information includes, but is not limited to, document topics, document key phrases, document timeliness, document quality, a source authority for the document, document depth, popularity of the document, location of the document both as a referenced location and/or as a geographic location associated with the document, such as a review of a business located at a specific geographic location and providing services that are available within a radius of the geographic location, etc. In some examples, the document understanding module employs machine learning models to semantically understand the document and classify the document into one or more logical categories. Such logical categories may include but are not limited to articles, news, products, etc.

Content embeddings are generated at 508 based on the information generated by and/or extracted by the document understanding module. For each content item (e.g., document), the content embedding module generates a document embedding using one or more trained machine learning models. The document embedding may be a relatively low-dimensional space representation of a translated higher-dimensional vector derived from information associated with each content item. For example, the document embedding is based on site information, such as site information 204 (FIG. 2), URL information, such as URL information 208 (FIG. 2), and content information, such as content information 212 (FIG. 2). The site information, URL information, and/or the content information is provided to a machine learning model, such as a transformer 216 (FIG. 2). The machine learning model transforms the higher dimensional information included in the site information, URL information, and/or content information into a lower dimensional representation, such as the document embedding 218 (FIG. 2). The method 500 may proceed to 510, where the document embedding is stored in a content index, such as the content index 136 (FIG. 1). The method 500 may end at 512.

Figure 6:
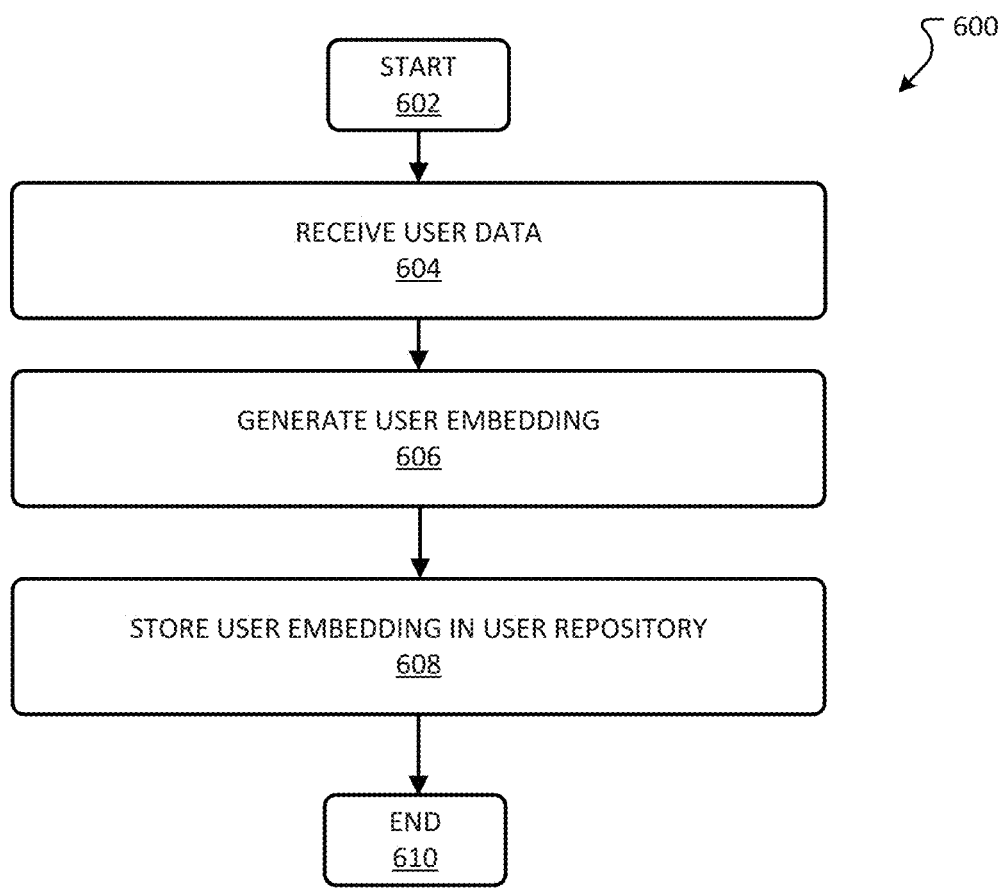
FIG. 6 depicts details of a method for generating a user embedding in accordance with examples of the present disclosure.

FIG. 6 depicts details of a method 600 for generating a user embedding in accordance with examples of the present disclosure. A general order for the steps of the method 600 is shown in FIG. 6. Generally, the method 600 starts at 602 and ends at 610. The method 600 may include more or fewer steps or may arrange the order of the steps differently than those shown in FIG. 6. The method 600 can be executed as a set of computer-executable instructions executed by a computer system and encoded or stored on a computer readable medium. In examples, aspects of the method 600 are performed by one or more processing devices, such as a computer or server. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc. described in conjunction with FIGS. 1-5.

The method starts at 602, where flow may proceed to 604. At 604, user information may be received. Examples of the user information may include, but is not limited to, a user id, explicit user interests, browser search history, search engine clicks, search engine queries, other content consumed by an application utilized by the user, and/or other user metric information (e.g., dwell time, telemetry data, etc.) that may be used to model user behaviors and user interests. The method 600 may proceed to 606 and generate a user embedding based on the received information.

The user embedding, which may be the same as or similar to the user embedding 236 (FIG. 2) may be a relatively low-dimensional space representation of a translated higher-dimensional vector derived from information associated with a user. For example, the user embedding may be based on user information, such as user information 222 (FIG. 2), user interest information, such as user interest information 226 (FIG. 2), and user history information, such as user history information 230 (FIG. 2). The user information, user interest information, and history information may be provided to a machine learning model, such as the transformer 234 (FIG. 2). The machine learning model may transform the higher dimensional information included in the user information, user interest information, and history information into a lower dimensional representation, such as the embedding. In examples, the machine learning model utilized by the method of FIG. 6 and the machine learning model utilized by the method of FIG. 5, may utilize the same or similar semantic space when generating the respective embeddings. Accordingly, the user embedding and the document embedding may include the same or similar semantic space. As the user embedding and the document embedding may share the same or similar semantic space, distance information between the user embedding and document embedding may be calculated and may be relied upon when obtaining an initial pool of documents as previously described. Once the user embedding is generated at 606, the method 600 may proceed to 608 and store the user embedding in a user repository, such as the user repository 142 (FIG. 1). The method 600 may end at 610.

Figure 7:
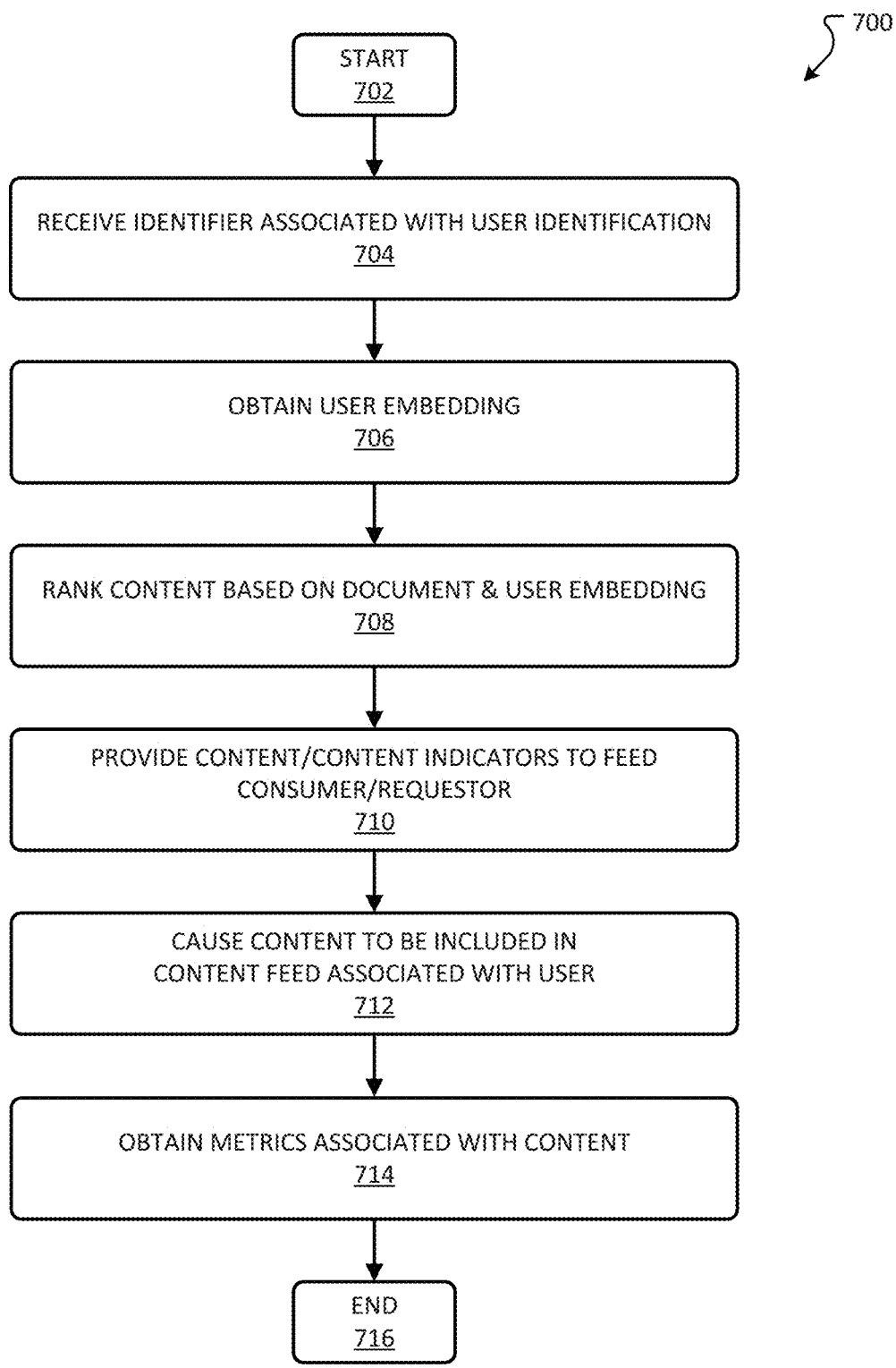
FIG. 7 depicts details of a method for recommending content to a user in accordance with examples of the present disclosure.

FIG. 7 depicts details of a method 700 for recommending content to a user in accordance with examples of the present disclosure. A general order for the steps of the method 700 is shown in FIG. 7. Generally, the method 700 starts at 702 and ends at 716. The method 700 may include more or fewer steps or may arrange the order of the steps differently than those shown in FIG. 7. The method 700 can be executed as a set of computer-executable instructions executed by a computer system and encoded or stored on a computer readable medium. In examples, aspects of the method 700 are performed by one or more processing devices, such as a computer or server. Further, the method 700 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-6.

The method starts at 702, where flow proceeds to 704. At 704, an identifier associated with a user identification is be received. For example, a user identifier may include, but is no not limited to a user identifier associated with a user id of a user logged into a website or otherwise authenticated against an authentication source, a session identifier, and/or a combination of information (such as geographic location, internet protocol (IP) address, computing device information (e.g., hard disk identifier or other hardware identifier) that can be used to uniquely identifier a user). The method 700 proceeds to 706, where a user embedding is retrieved. The user embedding can be retrieved from a user repository, such as the user repository 142 (FIG. 1). Based on the user embedding, content is ranked based on document embeddings and the user embedding at 708.

For example, the content is ranked by providing the user embedding to a content identification and ranking module, such as the content identification and ranking module 304 (FIG. 3). The content identification and ranking module identifies the top n document embeddings that are most similar to the user embedding. More specifically, a nearest neighbor search identifies a pool of document embeddings that are most similar to the user embedding. As the document embedding and the user embedding share the same or similar semantic space, a distance is determined between the user embedding and each document embedding. In examples, the nearest n number of documents may be included in a document pool. The method 700 proceeds to 708 where the content is ranked. For example, a machine learning model, such as a transformer 322 (FIG. 3), takes as input, the user embedding and one or more document embeddings; the machine learning model generates a pool of ranked documents, where each document in the pool of ranked documents includes a ranking based on the document embedding and the user embedding. In some examples, the content identification and ranking module identify and select documents from the pool of ranked documents that are most likely to be relevant to the user. A detrimental point process can be applied to ensure the ranked results are diverse and do not refer to the same content or similar content. Accordingly, a user-content quality scoring and a content-content similarity score may be used to select a subset of the pool of ranked documents.

The method 700 proceeds to 710, where the pool of ranked documents, and/or the subset of the pool of ranked documents are provided to a consumer, such as a website, database, or third-party vendor as recommended content. In examples, locations of the documents associated with the recommended content are provided via a network to one or more of the consumers, such as the website, database, or third-party vendor. In some examples, a requestor requests recommended content to provide in a user feed; at 710 identities and locations of such recommended content are provided to the requestor. In some examples, the recommended content refers to a signal document, website/webpage, etc. Alternatively, or in addition, recommended content may refer to a plurality of documents and/or websites/webpages. The method 700 proceeds to 712, where at least some of the recommended content is caused to be rendered at a user interface and displayed to a user. For example, the recommended content may be displayed in the display portion 108A (FIG. 1)

The method proceeds to 714 and where metrics associated with the recommended content are obtained. For example, real-time feedback on personalized content clicks can be utilized to drive subsequent personalization impressions and recommended content. Accordingly, the recommended content, the user identifier, content click rate for the recommended content, and a content click rate for other content are utilized to further personalize content to the user. That is, such metrics may be provided as user information and utilized as input when generating the user embedding. Other telemetry information, search history, topics of interest, geographic and demographic information may be utilized and consumed as part of the user profile and/or user embedding as previously discussed. The method 700 may end at 716.

Figure 8:
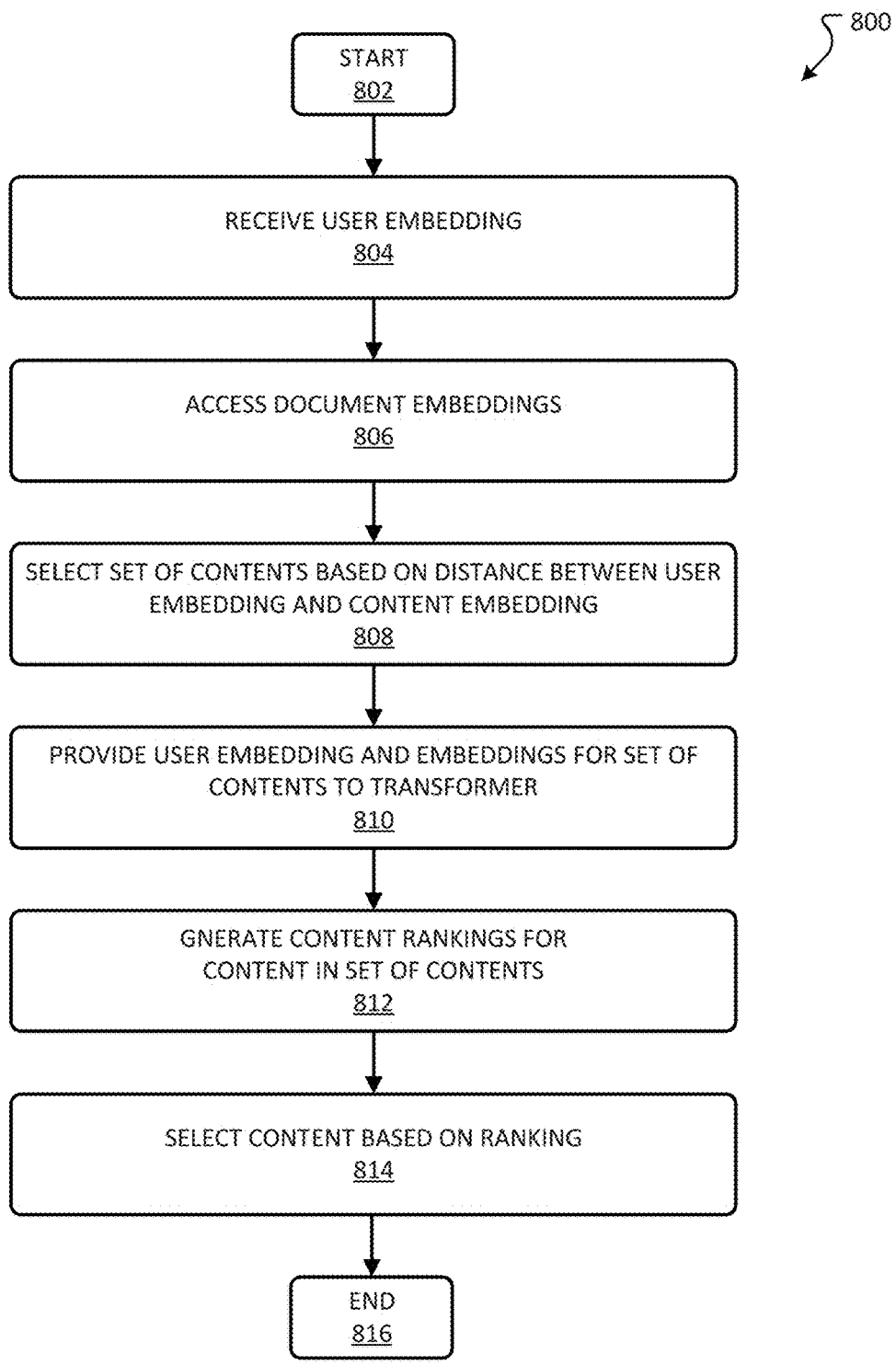
FIG. 8 depicts details of a method for identifying recommended content in accordance with examples of the present disclosure.

FIG. 8 depicts details of a method 800 for identifying recommended content in accordance with examples of the present disclosure. A general order for the steps of the method 800 is shown in FIG. 8. Generally, the method 800 starts at 802 and ends at 816. The method 800 may include more or fewer steps or may arrange the order of the steps differently than those shown in FIG. 8. The method 800 can be executed as a set of computer-executable instructions executed by a computer system and encoded or stored on a computer readable medium. In examples, aspects of the method 800 are performed by one or more processing devices, such as a computer or server. Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-7.

The method starts at 802, where flow proceeds to 804. At 804, a user embedding is received. As previously discussed, the user embedding refers to a relatively low-dimensional space representation of a translated higher-dimensional vector derived from information associated with the user. As an example, the user embedding may be generated in accordance with FIG. 6. At 806, a plurality of document embeddings are accessed. As previously discussed, the document embeddings may be relatively low-dimensional space representations of translated higher-dimensional vectors derived from information associated with each content item or document. The method 800 proceeds to 808, where a plurality of documents are selected based on a distance between the user embedding and the document embeddings. In examples, the plurality of documents may refer to a set of contents (e.g., a set of documents such as a set of document identifiers). At 810, the user embedding together with the document embeddings for the set of selected documents may be provided to a machine learning model, such as a transformer. The machine learning model generates content rankings for the content in the set of contents. For example, each document in the set of documents includes a ranking based on the document embedding and the user embedding. In some examples, the documents classified as most likely to receive a user interaction include a higher ranking than other documents. In addition, the documents may be ranked in accordance with relevance, novelty, serendipity, diversity, and explainability with respect to the user. In some examples, a detrimental point process may be applied to ensure the ranked results are diverse and do not refer to the same content or similar content. The method 800 proceeds to 814, where recommended content is selected. In some examples, a user-content quality scoring and a content-content similarity score are used to select a subset of the ranked content as discussed with respect to FIG. 3. In other examples, a single recommended document or item of content is selected. Alternatively, or in addition, a plurality of recommended documents and/or items of content may be selected. In accordance with examples of the present disclosure, the selection of content may refer to identifying content by an identifier (e.g., unique identifier, location etc. . . . ) that can be used to refer to the document or content. For example, the document or content itself may not be selected, but a location (e.g., URL) associated with the document or content may be selected. The selected content can be provided to a requestor and/or be provided to a user interface for display to a user. The method 800 may end at 816.

Figure 9:
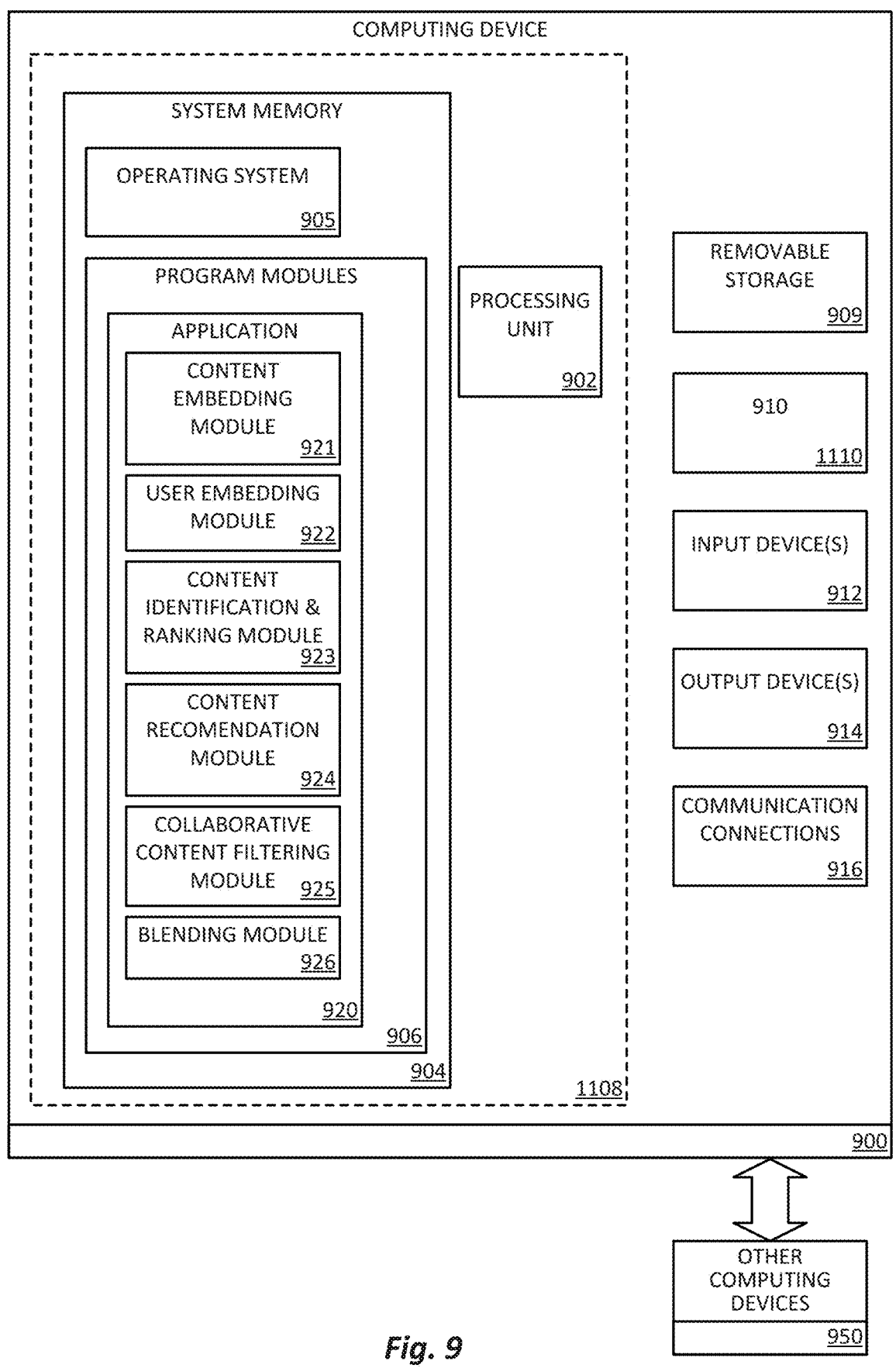
FIG. 9 depicts a block diagram illustrating physical components of a computing system with which aspects of the disclosure may be practiced.
Figure 10A:
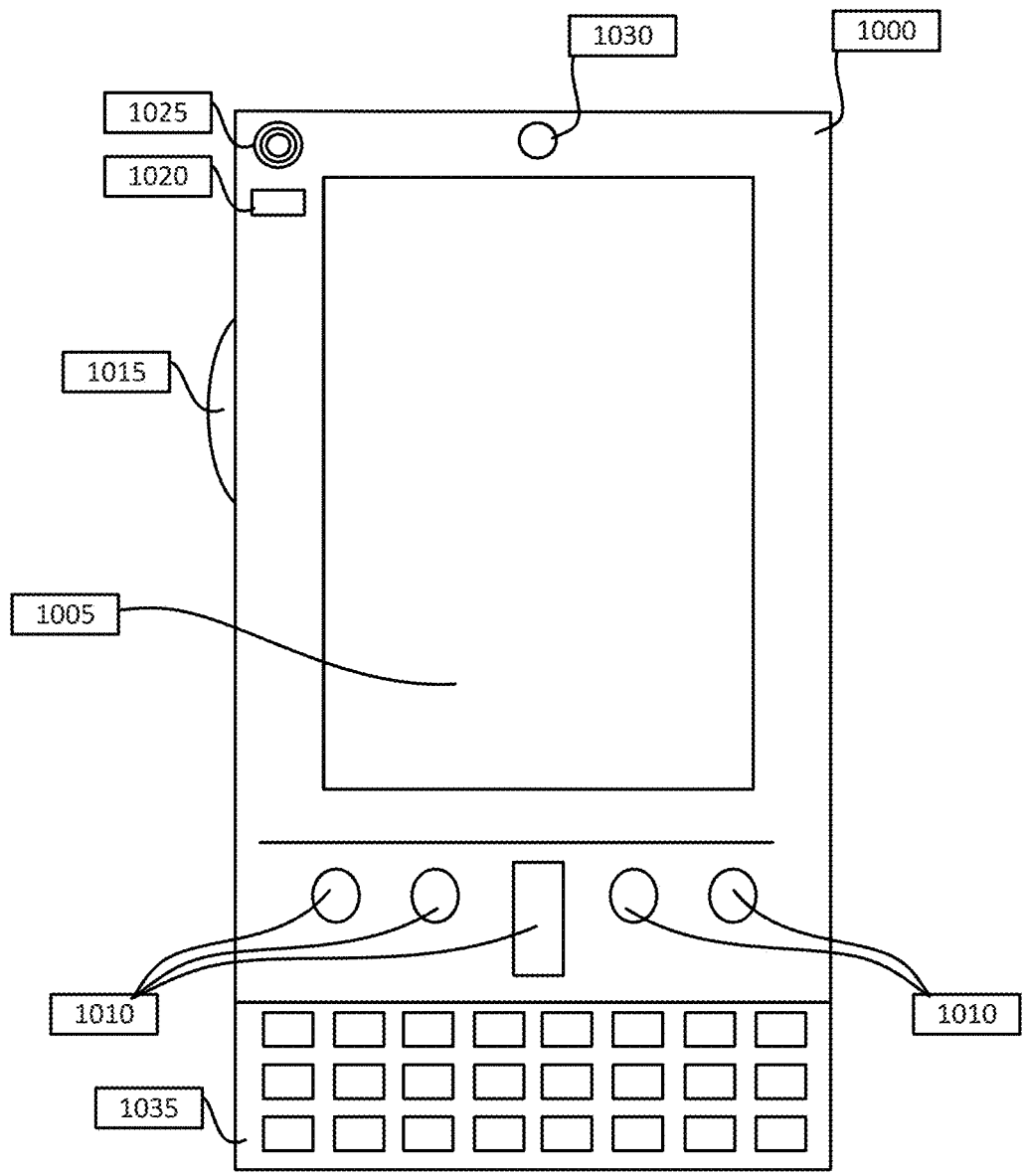
FIGS. 10A-10B depict details of one or more computing systems in accordance with examples of the present disclosure.
Figure 10B:
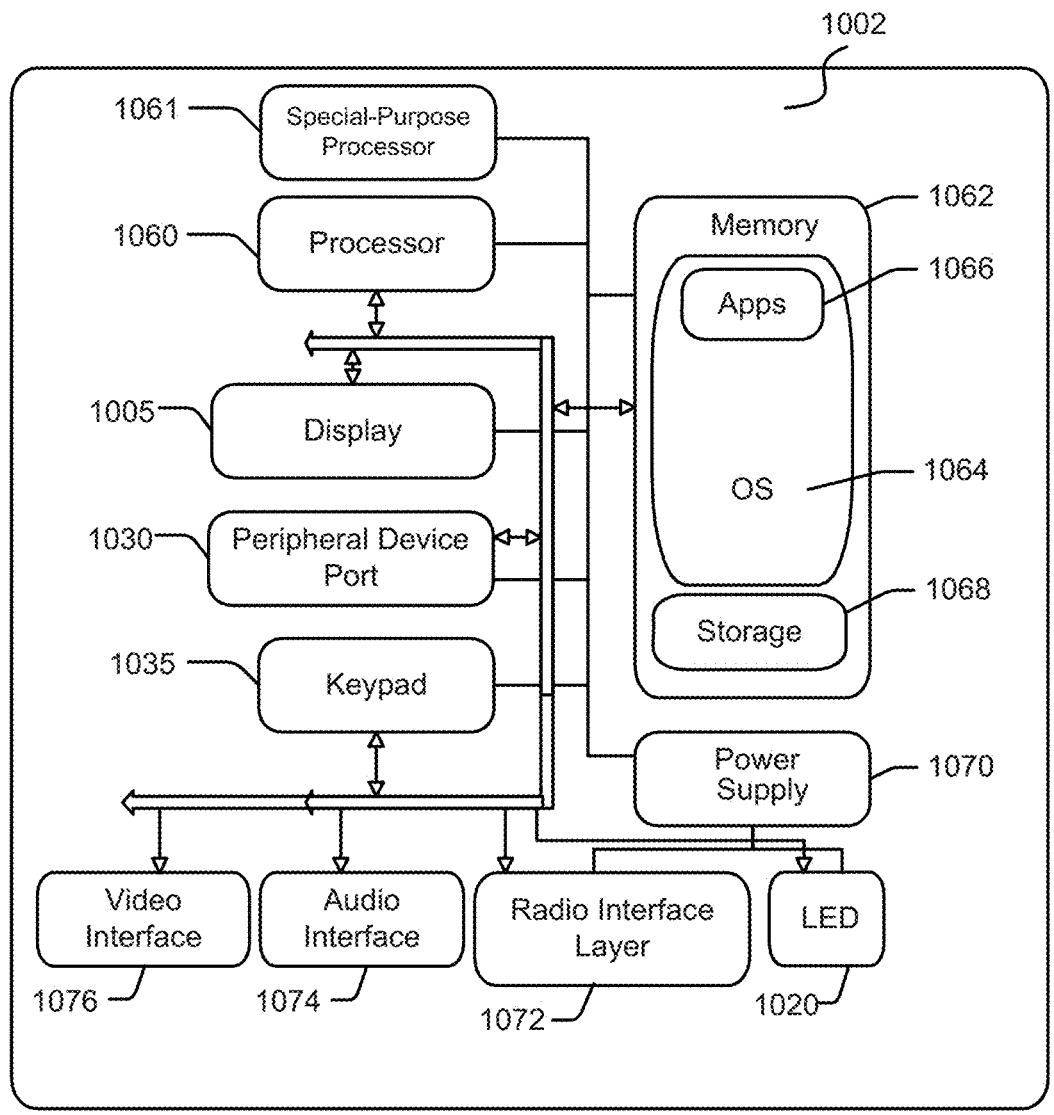
Figure 11:
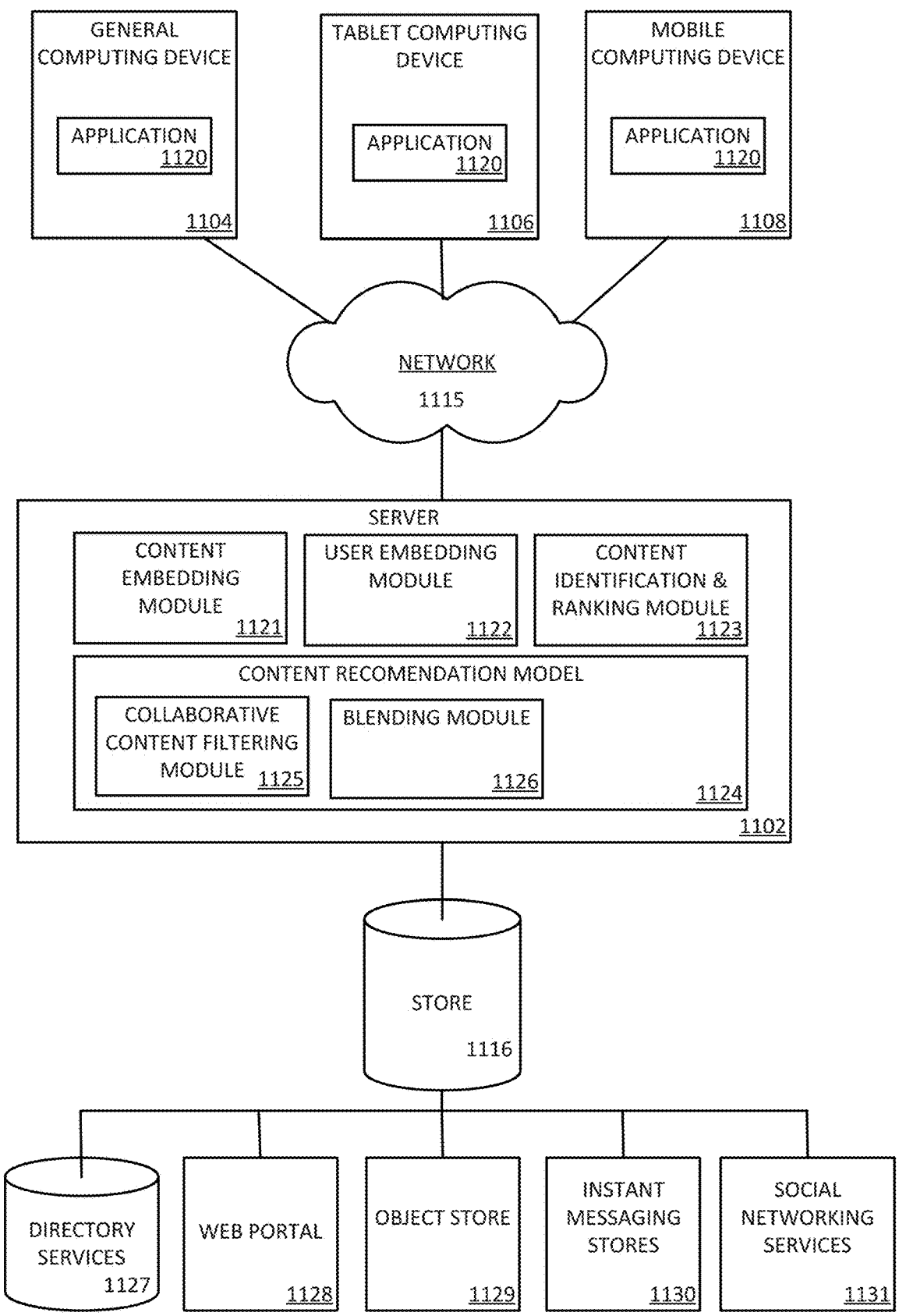
FIG. 11 depicts an architecture of a system for processing data received at a computing system in accordance with examples of the present disclosure.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of computing system configurations that may be utilized for practicing aspects of the disclosure, described herein.

FIG. 9 is a block diagram illustrating physical components (e.g., hardware) of a computing system 900 with which aspects of the disclosure may be practiced. The computing system components described below may be suitable for the computing and/or processing devices described above. In a basic configuration, the computing system 900 may include at least one processing unit 902 and a system memory 904. Depending on the configuration and type of computing system, the system memory 904 may comprise, but is not limited to, volatile storage (e.g., random-access memory (RAM)), non-volatile storage (e.g., read-only memory (ROM)), flash memory, or any combination of such memories.

The system memory 904 may include an operating system 905 and one or more program modules 906 suitable for running software application 920, such as one or more components supported by the systems described herein. As examples, system memory 904 may include the content embedding module 921, the user embedding module 9922, the content identification and ranking module 923, the content recommendation module 924, the collaborative content filtering module 925, and the blending module 926. The content embedding module 921 may be the same as or similar to the content embedding module 134 (FIG. 1) as previously described; the user embedding module 922 may be the same as or similar to the user embedding module 140 (FIG. 1) as previously described; the content identification & ranking module 923 may be the same as or similar to the content identification and ranking module 144 (FIG. 1) as previously described; the content recommendation module 924 may be the same as or similar to the content recommendation module 146 (FIG. 1) as previously described; the collaborative content filtering module 925 may be the same as or similar to the collaborative document filtering module 148 (FIG. 1) as previously described; and the blending module 926 may be the same as or similar to the blending module 150 (FIG. 1) as previously described. The operating system 905, for example, may be suitable for controlling the operation of the computing system 900.

Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing system 900 may have additional features or functionality. For example, the computing system 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., software applications 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit, discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing system 900 may include one or more communication connections 916 allowing communications with other computing systems 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing system 900. Any such computer storage media may be part of the computing system 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A-10B illustrate a mobile computing system 1000, for example, a mobile telephone, a smart phone, wearable computer (such as a smart watch), a tablet computer, a laptop computer, and the like, with which embodiments of the disclosure may be practiced. In some respects, the client may be a mobile computing system. With reference to FIG. 10A, one aspect of a mobile computing system 1000 for implementing the aspects is illustrated. In a basic configuration, the mobile computing system 1000 is a handheld computer having both input elements and output elements. The mobile computing system 1000 typically includes a display 1005 and one or more input buttons 1010 that allow the user to enter information into the mobile computing system 1000. The display 1005 of the mobile computing system 1000 may also function as an input device (e.g., a touch screen display).

If included, an optional side input element 1015 allows further user input. The side input element 1015 may be a rotary switch, a button, or any other type of manual input element. In alternative aspects, mobile computing system 1000 may incorporate greater or fewer input elements. For example, the display 1005 may not be a touch screen in some embodiments.

In yet another alternative embodiment, the mobile computing system 1000 is a portable phone system, such as a cellular phone. The mobile computing system 1000 may also include an optional keypad 1035. Optional keypad 1035 may be a physical keypad or a "soft" keypad generated on the touch screen display.

In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing system 1000 incorporates a vibration transducer for providing the user with tactile feedback. In yet another aspect, the mobile computing system 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing system. That is, the mobile computing system 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing system, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, maps programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing system 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like. The onboard camera may be the same as or similar to the previously described image sensor 620 and/or 632.

A mobile computing system 1000 implementing the system 1002 may have additional features or functionality. For example, the mobile computing system 1000 may also include additional data storage devices (removable and/or non-removable) such as, magnetic disks, optical disks, or tape. Such additional storage is illustrated in FIG. 10B by the non-volatile storage area 3068.

Data/information generated or captured by the mobile computing system 1000 and stored via the system 1002 may be stored locally on the mobile computing system 1000, as described above, or the data may be stored on any number of storage media that may be accessed by the device via the radio interface layer 1072 or via a wired connection between the mobile computing system 1000 and a separate computing system associated with the mobile computing system 1000, for example, a server computer in a distributed computing network, such as the Internet. As should be appreciated such data/information may be accessed via the mobile computing system 1000 via the radio interface layer 1072 or via a distributed computing network. Similarly, such data/information may be readily transferred between computing systems for storage and use according to well-known data/information transfer and storage means, including electronic mail and collaborative data/information sharing systems.

FIG. 11 illustrates one aspect of the architecture of a system for processing data received at a computing system from a remote source, such as a personal computer 1104, tablet computing device 1106, or mobile computing device 1108, as described above. Content at a server device 1102 may be stored in different communication channels or other storage types. For example, various documents may be stored using a directory service 1127, a web portal 1128, a mailbox service 1129, an instant messaging store 1130, or social networking services 1131.

One or more of the previously described program modules 906 or software applications 920 may be employed by server device 1110 and/or the personal computer 1104, tablet computing device 1106, or mobile computing device 1108, as described above. For example, the server device 1102 may include the content embedding module 1121, the user embedding module 1122, the content identification and ranking module 1123, the content recommendation module 1124, the collaborative content filtering module 1125, and the blending module 1126. The content embedding module 1121 may be the same as or similar to the content embedding module 134 (FIG. 1) as previously described; the user embedding module 1122 may be the same as or similar to the user embedding module 140 (FIG. 1) as previously described; the content identification & ranking module 1123 may be the same as or similar to the content identification and ranking module 144 (FIG. 1) as previously described; the content recommendation module 1124 may be the same as or similar to the content recommendation module 146 (FIG. 1) as previously described; the collaborative content filtering module 1125 may be the same as or similar to the collaborative document filtering module 148 (FIG. 1) as previously described; and the blending module 1126 may be the same as or similar to the blending module 150 (FIG. 1) as previously described.

The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for performing a targeted search based on user interests according to at least the examples provided in the sections below:

(A1) In one aspect, some embodiments include a method of performing a targeted search based on user interests. The method is performed at a targeted search system (e.g., 106) in data communication with a network (e.g., 128). The method includes: (i) receiving a user identifier (e.g., 138A) for a user (e.g., 102); (ii) retrieving a user embedding (e.g., 236/310) based on the user identifier (e.g., 138A), the user embedding (e.g., 236/310) created according to one or more user interests (e.g., 222/226/230); (iii) identifying a set of document embeddings (e.g., 315) from a plurality of document embeddings (e.g., 308) based on the user embedding (e.g., 310), each document embedding of the set of document embeddings (e.g., 315) determined to be within a first distance of the user embedding (e.g., 310); (iv) generating a ranking for each document embedding of the set of document embeddings (e.g., 315), wherein the ranking for each document embedding (e.g., 324) of the set of document embeddings (e.g., 315) is based on the user embedding (e.g., 310); and (v) recommending to the user (e.g., 102) at least one document (e.g., 154) based on the ranking for each document embedding of the set of document embeddings (e.g., 315).

(A2) In some embodiments of A1, the plurality of document embeddings (e.g., 308) and the user embedding (e.g., 236/310) are within a same semantic space (e.g., 139).

(A3) In some embodiments of A1-A2, the method further includes generating the ranking for each document embedding (e.g., 324) of the set of document embeddings (e.g., 315) using a machine learning model (e.g., 216), the machine learning model (e.g., 216) ranking each document embedding (e.g., 324) of the set of document embeddings (e.g., 315) based on one or more of relevancy, novelty, and diversity.

(A4) In some embodiments of A1-A3, the method further includes: generating, via the machine learning model (e.g., 234), the user embedding (e.g., 236/310) based on received indications of user characteristics (e.g., 222), user interests (e.g., 226), and user actions specific to the user (e.g., 102), wherein the user interests (e.g., 226) indicate one or more topics of interest (e.g., 228A) of the user (e.g., 102) and one or more topics (e.g., 228B) that are not of interest of the user (e.g., 102), and wherein the user actions are based on one or more previous documents (e.g., 130) viewed by the user (e.g., 102).

(A5) In some embodiments of A1-A4, the method further includes extracting location (e.g., 208) and content information (e.g., 212) from a document (e.g., 130); providing the location (e.g., 208) and content information (e.g., 212) for the document (e.g., 130) to a machine learning model (e.g., 216); generating, via the machine learning model, a document embedding (e.g., 218) specific to the document (e.g., 130); and adding the document embedding (e.g., 218) to the plurality of document embeddings (e.g., 136).

(A6) In some embodiments of A1-A5, the method further includes causing the recommended at least one document (e.g., 154) to be displayed at an output device (e.g., 140) associated with the user (e.g., 102).

(A7) In some embodiments of A1-A6, the method further includes: receiving an indication (e.g., 138G) that a user selected the recommended at least one document (e.g., 154) displayed to the output device (e.g., 104); generating another user embedding (e.g., 236/310) based on the received indication (e.g., 138G); identifying a second set of document embeddings (e.g., 315) from the plurality of document embeddings (e.g., 308) based on the another user embedding (e.g., 236/310); generating a ranking for each document embedding (e.g., 324) of the second set of document embeddings (e.g., 315), wherein the ranking for each document embedding (e.g., 324) of the second set of document embeddings (e.g., 315) is based on the another user embedding (e.g., 310); and recommending to the user at least one document (e.g., 154) based on the ranking for each document embedding (e.g., 324) of the second set of document embeddings (e.g., 315).

In yet another aspect, some embodiments include a computing system including one or more processors and memory coupled to the one or more processors, the memory storing one or more programs configured to be executed by the one or more processors, the one or more programs including instructions for performing any of the methods described herein (e.g., A1-A7 described above).

In yet another aspect, some embodiments include a non-transitory computer-readable storage medium storing one or more programs for execution by one or more processors of a storage device, the one or more programs including instructions for performing any of the methods described herein (e.g., A1-A7 described above).

The present disclosure relates to systems and methods for performing a targeted search based on user interests according to at least the examples provided in the sections below:

(B1) In one aspect, some embodiments include a method of performing a targeted search based on user interests. The method is performed at a targeted search system (e.g., 106) in data communication with a network (e.g., 128). The method includes: extracting information from each document (e.g., 130) of a plurality of documents (e.g., 130A-130D); (ii) for each document (e.g., 130) of the plurality of documents (e.g., 130A-130D), generating a document embedding (e.g., 218) based on the extracted information; (iii) receiving user interest information (e.g., 226) for a user (e.g., 102); (iv) generating a user embedding (e.g., 236) based on the received user interest information (e.g., 226), the user embedding (e.g., 236) and the document embedding (e.g., 218) sharing a same semantic space (e.g., 139); (v) identifying a set of document embeddings (e.g., 315) from the plurality of document embeddings (e.g., 308), each document embedding of the set of document embeddings (e.g., 315) being within a first distance of the user embedding (e.g., 236); (vi) generating a ranking for each document embedding of the set of document embeddings (e.g., 315), wherein the ranking for each document embedding (e.g., 324) is based on the user embedding (e.g., 236/310); and (vii) recommending to the user (e.g., 102), at least one document (e.g., 154) based on the document embedding ranking.

(B2) In some embodiments of B1, the recommended at least one document (e.g., 154) is rendered to a display device (e.g., 104) associated with a user (e.g., 102) associated with the user embedding (e.g., 236).

(B3) In some embodiments of B1-B2, the method further includes: receiving an indication (e.g., 136G) that the user selected the recommended at least one document (e.g., 154); generating another user embedding (e.g., 236/310) associated with the user (e.g., 102) based on the received indication (e.g., 136G); identifying a second set of document embeddings (e.g., 315) from the plurality of document embeddings (e.g., 308) based on the another user embedding (e.g., 236/310); generating a ranking for each document embedding (e.g., 324) of the second set of document embeddings (e.g., 315), wherein the ranking for each document embedding (e.g., 324) of the second set of document embeddings (e.g., 315) is based on the another user embedding (e.g., 310); and recommending to the user at least one document (e.g., 154) based on the ranking for each document embedding (e.g., 324) of the second set of document embeddings (e.g., 315).

(B4) In some embodiments of B1-B3, the method further includes generating the ranking for each document embedding of the plurality of document embeddings using a machine learning model, the machine learning model ranking each document embedding based on one or more of relevancy, novelty, and diversity.

(B5) In some embodiments of B1-B4, the method further includes generating, at a machine learning model (e.g., 234), the user embedding (e.g., 236/310) based on received indications of user characteristics (e.g., 222), user interests (e.g., 226), and user actions specific to the user (e.g., 102), wherein the user interests (e.g., 226) indicate one or more topics of interest (e.g., 228A) of the user (e.g., 102) and one or more topics (e.g., 228B) that are not of interest of the user (e.g., 102), and wherein the user actions are based on one or more previous documents (e.g., 130) viewed by the user (e.g., 102).

(B6) In some embodiments of B1-B5, the method further includes receiving a user identifier (e.g., 138A); and retrieving a user profile (e.g., 126) based on the user identifier (e.g., 138A), the user profile including the user embedding (e.g., 236/310).

(B7) In some embodiments of B1-B6, the method further includes receiving, for a plurality of documents (e.g., 130) associated with the set of document embeddings (e.g., 315), user interest information from a plurality of users (e.g., 416); and identifying a subset of the set of document embeddings (e.g., 315) based on the user interest information from the plurality of users (e.g., 416) matching user interest information for the user (e.g., 102), wherein the recommended at least one document (e.g., 154) is based on the subset of the set of document embeddings.

In yet another aspect, some embodiments include a computing system including one or more processors and memory coupled to the one or more processors, the memory storing one or more programs configured to be executed by the one or more processors, the one or more programs including instructions for performing any of the methods described herein (e.g., B1-B7 described above).

In yet another aspect, some embodiments include a non-transitory computer-readable storage medium storing one or more programs for execution by one or more processors of a storage device, the one or more programs including instructions for performing any of the methods described herein (e.g., B1-B7 described above).

The present disclosure relates to systems and methods for performing a targeted search based on user interests according to at least the examples provided in the sections below:

(C1) In one aspect, some embodiments include a method of performing a targeted search based on user interests. The method is performed at a targeted search system (e.g., 106) in data communication with a network (e.g., 128). The method includes: (i) receiving a user identifier (e.g., 138A) for a user (e.g., 102); (ii) retrieving a user profile (e.g., 125) based on the user identifier (e.g., 138A), the user profile (e.g., 125) including a user embedding (236/310) created according to one or more user interests (e.g., 222/226/230); (iii) identifying a plurality of document embeddings (e.g., 315) based on the user embedding (e.g., 236/310), each document embedding (e.g., 315) of the plurality of document embeddings (e.g., 315) determined to be within a first distance of the user embedding (e.g., 310); (iv) generating a ranking for each document embedding of the plurality of document embeddings (e.g., 315), wherein the ranking for each document embedding (e.g., 324) of the plurality of document embeddings (e.g., 315) is based on the user embedding (e.g., 310); and (v) recommending to the user (e.g., 102) at least one document (e.g., 154) based on the ranking for each document embedding of the plurality of document embeddings (e.g., 315).

(C2) In some embodiments of C1, the plurality of document embeddings (e.g., 308) and the user embedding (e.g., 236/310) are within a same semantic space (e.g., 139).

(C3) In some embodiments of C1-B2, the method further includes generating the ranking for each document embedding (e.g., 324) of the plurality of document embeddings (e.g., 315) using a machine learning model (e.g., 216), the machine learning model (e.g., 216) ranking each document embedding of the plurality of document embeddings (e.g., 315) based on one or more of relevancy, novelty, and diversity.

(C4) In some embodiments of C1-C3, the method further includes generating, via the machine learning model (e.g., 234), the user embedding (e.g., 236/310) based on received indications of user characteristics (e.g., 222), user interests (e.g., 226), and user actions specific to the user (e.g., 102), wherein the user interests (e.g., 226) indicate one or more topics of interest (e.g., 228A) of the user (e.g., 102) and one or more topics (e.g., 228B) that are not of interest of the user (e.g., 102), and wherein the user actions are based on one or more previous documents (e.g., 130) viewed by the user (e.g., 102).

(C5) In some embodiments of C1-C4, the method further includes extracting location (e.g., 208) and content information (e.g., 212) from a document (e.g., 130); providing the location (e.g., 208) and content information (e.g., 212) for the document (e.g., 130) to a machine learning model (e.g., 216); generating, via the machine learning model, a document embedding (e.g., 218) specific to the document (e.g., 130); and adding the document embedding (e.g., 218) to the plurality of document embeddings (e.g., 136).

(C6) In some embodiments of C1-C5, the method further includes causing the recommended at least one document (e.g., 154) to be displayed at an output device (e.g., 104) associated with the user (e.g., 102); receiving an indication (e.g., 138G) that a user (e.g., 102) selected the recommended at least one document (e.g., 154) displayed to the output device (e.g., 104); generating another user embedding (e.g., 310) based on the received indication (e.g., 138G); identifying a second set of document embeddings (e.g., 315) from the plurality of document embeddings (e.g., 308) based on the another user embedding (e.g., 310); generating a ranking for each document embedding (e.g., 324) of the second set of document embeddings (e.g., 315), wherein the ranking for each document embedding (e.g., 324) of the second set of document embeddings (e.g., 315) is based on the another user embedding (e.g., 310); and recommending to the user (e.g., 102) at least one document (e.g., 154) based on the ranking for each document embedding (e.g., 324) of the second set of document embeddings (315).

In yet another aspect, some embodiments include a computing system including one or more processors and memory coupled to the one or more processors, the memory storing one or more programs configured to be executed by the one or more processors, the one or more programs including instructions for performing any of the methods described herein (e.g., C1-C6 described above).

In yet another aspect, some embodiments include a non-transitory computer-readable storage medium storing one or more programs for execution by one or more processors of a storage device, the one or more programs including instructions for performing any of the methods described herein (e.g., C1-C6 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for performing a targeted search based on user interests, the method comprising:
   generating a user embedding as a low-dimensional space representation of a user based on user information via a first machine learning model;
   generating a plurality of document embeddings as low-dimensional space representations of documents via a second machine learning model;
   receiving a user identifier for the user;
   retrieving the user embedding based on the user identifier;
   ranking one or more document embeddings of the plurality of document embeddings based on the user embedding; and
   recommending to the user at least one document based on the ranking of the document embeddings.

2. The method of claim 1, wherein the user embedding further comprises a low-dimensional space representation of a translated higher-dimensional vector derived from the user information associated with the user.

3. The method of claim 1, wherein ranking one or more document embeddings of the plurality of document embeddings based on the user embedding comprises:
   identifying a set of document embeddings from the plurality of document embeddings using the user embedding, each document embedding of the set of document embeddings determined to be within a first distance of the user embedding; and ranking each document embedding of the set of document embeddings based on the user embedding.

4. The method of claim 3, wherein ranking each document embedding of the set of document embeddings based on the user embedding comprises ranking each document embedding of the set of document embeddings using a third machine learning model based on one or more of relevancy, novelty, and diversity.

5. The method of claim 1, wherein the user information comprises the user identifier, user characteristics, user interests, and user actions, the user interests further comprise an indication of one or more topics of interest to the user and one or more topics that are not of interest to the user, and the user actions further comprise one or more previous documents viewed by the user.

6. The method of claim 1, further comprising:
extracting location and content information from a document;
providing the location and content information for the document to a fourth machine learning model;
generating, via the fourth machine learning model, a document embedding specific to the document; and
adding the document embedding to the plurality of document embeddings.

7. The method of claim 1, further comprising displaying the recommended at least one document at an output device associated with the user.

8. The method of claim 7, further comprising:
receiving an indication that another user selected the recommended at least one document displayed to the output device;
generating another user embedding based on the received indication;
identifying a second set of document embeddings from the plurality of document embeddings based on the another user embedding;
generating a ranking for each document embedding of the second set of document embeddings, wherein the ranking for each document embedding of the second set of document embeddings is based on the another user embedding; and
recommending to the user at least one document based on the ranking for each document embedding of the second set of document embeddings.

9. A system for performing a targeted search based on user interests, the system comprising:
a processor;
memory including instructions, which when executed by the processor, cause the processor to:
generate a user embedding as a low-dimensional space representation of a user based on user information via a first machine learning model;
generate a plurality of document embeddings as low-dimensional space representations of documents via a second machine learning model;
receive a user identifier for the user;
retrieve the user embedding based on the user identifier;
rank one or more document embeddings of the plurality of document embeddings based on the user embedding; and
recommend to the user at least one document based on the ranking of the document embeddings.

10. The system of claim 9, wherein to rank one or more document embeddings of the plurality of document embeddings based on the user embedding comprises to:
identify a set of document embeddings from the plurality of document embeddings using the user embedding, each document embedding of the set of document embeddings determined to be within a first distance of the user embedding; and
rank each document embedding of the set of document embeddings based on the user embedding.

11. The system of claim 10, wherein to rank each document embedding of the set of document embeddings based on the user embedding comprises to rank each document embedding of the set of document embeddings using a third machine learning model based on one or more of relevancy, novelty, and diversity.

12. The system of claim 10, wherein the user information comprises the user identifier, user characteristics, user interests, and user actions, the user interests further comprise an indication of one or more topics of interest to the user and one or more topics that are not of interest to the user, and the user actions further comprise one or more previous documents viewed by the user.

13. The system of claim 9, wherein the instructions, which when executed by the processor, cause the processor to:
extract location and content information from a target document;
provide the location and content information for the target document to a fourth machine learning model;
generate, via the fourth machine learning model, a target document embedding specific to the target document; and
add the target document embedding to the plurality of document embeddings.

14. The system of claim 9, wherein the instructions, which when executed by the processor, cause the processor to display the recommended at least one document at an output device associated with the user.

15. A computer storage medium including instructions, which when executed by a processor, cause the processor to:
generate a user embedding as a low-dimensional space representation of a user based on user information via a first machine learning model;
generate a plurality of document embeddings as low-dimensional space representations of documents via a second machine learning model;
receive a user identifier for the user;
retrieve the user embedding based on the user identifier;
rank one or more document embeddings of the plurality of document embeddings based on the user embedding; and
recommend to the user at least one document based on the ranking of the document embeddings.

16. The computer storage medium of claim 15, wherein to rank one or more document embeddings of the plurality of document embeddings based on the user embedding comprises to:
identify a set of document embeddings from the plurality of document embeddings using the user embedding, each document embedding of the set of document embeddings determined to be within a first distance of the user embedding; and
rank each document embedding of the set of document embeddings based on the user embedding.

17. The computer storage medium of claim 15, wherein the user information comprises the user identifier, user characteristics, user interests, and user actions, the user interests further comprise an indication of one or more topics of interest to the user and one or more topics that are not of interest to the user, and the user actions further comprise one or more previous documents viewed by the user.

18. The computer storage medium of claim 15, wherein the instructions, which when executed by the processor, cause the processor to:
    extract location and content information from a target document;
    provide the location and content information for the target document to a fourth machine learning model;
    generate, via the fourth machine learning model, a target document embedding specific to the target document; and
    add the target document embedding to the plurality of document embeddings.

19. The computer storage medium of claim 15, wherein the instructions, which when executed by the processor, cause the processor to display the recommended at least one document at an output device associated with the user.

20. The method of claim 19, wherein the instructions, which when executed by the processor, cause the processor to:
    receive an indication that another user selected the recommended at least one document displayed to the output device;
    generate another user embedding based on the received indication;
    identify a second set of document embeddings from the plurality of document embeddings based on the another user embedding;
    generate a ranking for each document embedding of the second set of document embeddings, wherein the ranking for each document embedding of the second set of document embeddings is based on the another user embedding; and
    recommend to the user at least one document based on the ranking for each document embedding of the second set of document embeddings.

\* \* \* \* \*